(12) United States Patent
Narusawa et al.

(10) Patent No.: US 7,207,735 B2
(45) Date of Patent: Apr. 24, 2007

(54) DEVICE AND ITS OPERATION METHOD FOR ENABLING PRINTER TO PRINT PAGE OF DESIRED DESIGN

(75) Inventors: Hideyuki Narusawa, Nagano-ken (JP); Makoto Oyanagi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 309 days.

(21) Appl. No.: 10/509,496

(22) PCT Filed: Apr. 4, 2003

(86) PCT No.: PCT/JP03/04335

§ 371 (c)(1),
(2), (4) Date: Sep. 29, 2004

(87) PCT Pub. No.: WO03/085510

PCT Pub. Date: Oct. 16, 2003

(65) Prior Publication Data

US 2005/0141941 A1    Jun. 30, 2005

(30) Foreign Application Priority Data

Apr. 5, 2002    (JP)    ............................. 2002-103350

(51) Int. Cl.
  *B41J 11/44* (2006.01)
(52) U.S. Cl. .................... 400/76; 400/61; 358/1.15; 358/1.18
(58) Field of Classification Search ................. 400/70, 400/76, 61–63; 358/1.1, 1.6, 1.9, 1.15–1.18
See application file for complete search history.

(56) References Cited

U.S. PATENT DOCUMENTS

| | | | |
|---|---|---|---|
| 6,504,960 B2 | 1/2003 | Takahashi | |
| 7,038,714 B1 * | 5/2006 | Parulski et al. | 348/207.2 |
| 2001/0043354 A1 | 11/2001 | Miyake et al. | |
| 2002/0006235 A1 | 1/2002 | Takahashi | |
| 2005/0111042 A1 * | 5/2005 | Ogiwara | 358/1.18 |
| 2005/0174600 A1 * | 8/2005 | Kitahara et al. | 358/1.15 |

FOREIGN PATENT DOCUMENTS

| | | |
|---|---|---|
| EP | 1 158 763 A2 | 11/2001 |
| JP | 3179576 B | 1/1994 |
| JP | 10-65867 A | 3/1998 |
| JP | 11055605 A * | 2/1999 |
| JP | 11-187314 A | 7/1999 |

(Continued)

*Primary Examiner*—Minh Chau
(74) *Attorney, Agent, or Firm*—Sughrue Mion, PLLC

(57) ABSTRACT

The present invention increases the freedom of usage of a page design.

A digital camera 1 generates, in a file format that can be parsed by a printer, a print job for printing a full page design in which an image desired by a user is applied to a page layout by using a layout definition file that describes a page layout containing one or more image areas disposed on a page, as well as an image file desired by the user that is applied to a predetermined image area in the page layout. The print job file thus generated (print job file) is parsed by a printer 13 and printing is executed on the basis of the result of this parsing. The layout definition file and image file are associated with the print job file.

12 Claims, 13 Drawing Sheets

FOREIGN PATENT DOCUMENTS

| | | |
|---|---|---|
| JP | 11-243526 A | 9/1999 |
| JP | 2000-108446 A | 4/2000 |
| JP | 2000-216990 A | 8/2000 |
| JP | 2001-111809 A | 4/2001 |
| JP | 2001-352505 A | 12/2001 |
| WO | WO 97/50243 A1 | 12/1997 |

* cited by examiner

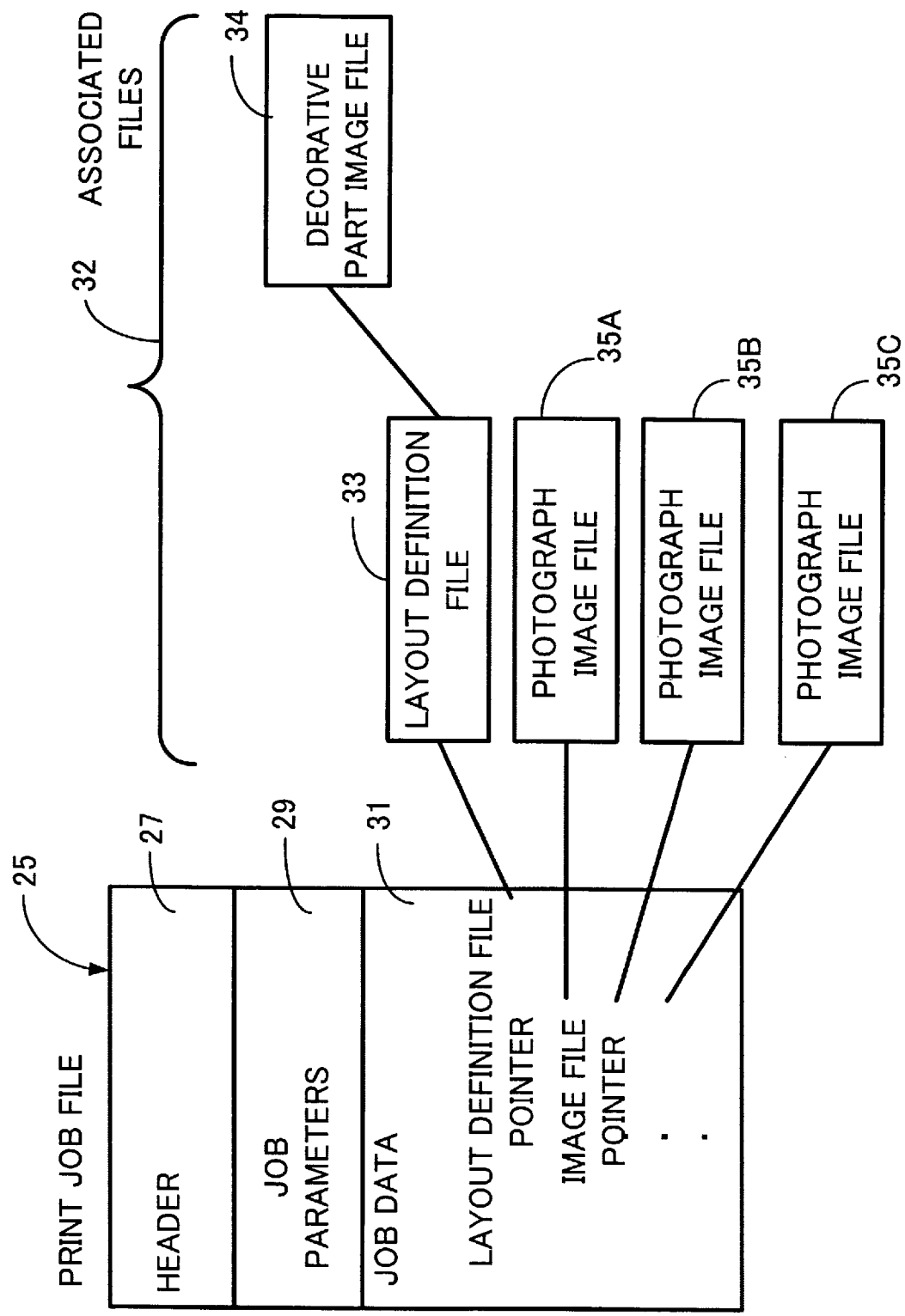

FIG.3

```
[Head. Start]      ⎫
Version ="1.00"    ⎬ 27
     .             ⎪
     .             ⎪
[Head. End]        ⎭

[JobParam. Start]      ⎫
#Papere Type=PMPAPER   ⎪
#PaperSize=A4          ⎬ 29A
#Layout="100. usd"     ⎪
[JobParam. End]        ⎭

[JobData.Start]                              ⎫
#Picture="¥DDIM¥100SAND¥DSC00001. JPG"       ⎪
#Picture="¥DDIM¥100SAND¥DSC00002. JPG"       ⎬ 31A
#Picture="¥DDIM¥100SAND¥DSC00003. JPG"       ⎪
[JobData.End]                                ⎭

[JobParam. Start]      ⎫
#Paper Type=PMPAPER    ⎪
#Paper Size=A4         ⎬ 29B
#Layout="200. usd"     ⎪
[JobParam. End]        ⎭

[JobData.Start]                              ⎫
#Picture="¥DDIM¥100SAND¥DSC00001. JPG"       ⎪
#bright=MORE BRIGHT                          ⎬ 31B
#Picture="¥DDIM¥100SAND¥DSC00002. JPG"       ⎪
#Picture="¥DDIM¥100SAND¥DSC00003. JPG"       ⎪
[JobData.End]                                ⎭
```

```
[HEADER]                                    300
HdRevision=02. 00
HdAuthor="SEIKO EPSON Corpration"
HdCopyright="SEIKO EPSON Corpration"
HdChangeFlag=Possible
HdKeyWord="Christmas", "Greeting"
HdTitle="EPSON Script Sample"
HdComment="Test Sample"
HdDirection=Vertical
HdSound="..EPUDL¥GSOUND.PCM"
HdCapacity=1024000
HdThumbnail="..EPUDL¥IMAGE¥001UDL.USF"
HdPhysicalPaperSize=R89
HdMargines=3,3,3,3

[PAGE]                                      301

Draw Picture("",1, 50, 100, 1500, 1200, 4, 0, 5 )
DrawPicture("..EPUDL¥IMAGE¥001.EFF",0, 10, 20,100, 200, 0,1,4)
Draw Strings("..¥EPUDL¥IMAGE¥001.EFF",0,"%G, %d, %y",
100, 200, 200, 300, "Mincho",0, 128, 128, 128)

Draw Line ( 10, 20, 10, 200, 5, 255, 0, 0 )
Draw Line ( 100, 20, 100, 200, 5, 255, 0, 0 )
Draw Line ( 10, 20, 100, 20, 5, 255, 0, 0 )
Draw Line ( 10, 200, 100, 200, 5, 255, 0, 0 )
```

33 ical information for identifying the image file, for example).
DEVICE AND ITS OPERATION METHOD FOR ENABLING PRINTER TO PRINT PAGE OF DESIGN

TECHNICAL FIELD

The present invention relates to an improvement of the technology enabling a printer to print a page with a desired design.

BACKGROUND ART

The taking of photographs by means of a digital camera and the printing of the image data of such photographs by means of an electronic printer have been actively implemented. One merit of such a method is that the user is able to freely create a printout of a photograph by himself/herself.

A variety of proposals has been made to permit an abundance of applications for photograph printouts which the user is able to create by himself/herself and to make the work involved straightforward. For example, Japanese Patent Application Laid Open Nos. 2000-108446 and 2001-111809 and so forth disclose a print control device whereby a predetermined page layout is captured from a built-in ROM or from the outside, an image of a photograph captured by means of a digital camera is captured from outside, and then, in accordance with a user instruction, after the captured page layout and captured photographic image have been synthesized, the synthesized image is sent to a printer and printed thereby.

DISCLOSURE OF THE INVENTION

However, the above-described conventional print control device is subject to the following problems.

Firstly, such a device does not allow the user to freely design the page layout.

Secondly, such a device does not support free usage in which a page design, which is completed by inserting photographic images desired by the user in a page layout, is taken to a separate printer and printed or sent to another device, and so forth.

Based on the above description, when there has been a demand for the user to freely use a free page design, the conventional technology has not been able to adequately satisfy this demand.

It is accordingly an object of the present invention to raise the freedom of usage of page designs.

The device according to the present invention is a device enabling a printer to print a page with a desired design, comprising: association means for associating an image area in a page layout containing the image area disposed on a page, and a specified image; and print job file creating means for creating, on the basis of the association, a print job file that renders a print job for printing a page on which the specified image is applied to the image area.

Here, the "specified image" is an image desired by the user or a predetermined image, for example.

Furthermore, an "image area" is not restricted to a region with an area, but may instead be a point or line representing the application position of the specified image (or decorative part image to be described subsequently), for example. When the image area is a point (hereinafter referred to an "application point"), the application of the specified image is performed as a result of a predetermined point (center or predetermined angle, for example) on the specified image overlapping the application point, for example. In addition, when the image area is a line (hereinafter referred to as an "application line"), the application of the specified image is performed as a result of a predetermined line (part of the edge of the image, for example) on the specified image overlapping the application line, for example.

Moreover, the "print job file" is a file in which are described at least the relationship with a layout file defining the page layout (layout identification information for identifying the layout file, for example), and the relationship with an image file of the specified image (image identification information for identifying the image file, for example). For example, once the printer has parsed the print job file, the printer acquires the page layout and specified image on the basis of this identification information and is thus able to print a page design in which the specified image is applied to an image area in the page layout. The job file may be rendered such that the image identification information for the image file is described in the layout file that defines the page layout.

Further, all or part of the printing conditions required for the printing (such as the paper type, size, number of print copies, and the image correction method, for example), for example, may be described in the print job file. When part of the printing conditions are described, the printer can execute printing on the basis of the partial printing conditions described in the print job file and the remaining printing conditions set by the printer, for example.

In addition, the functions of the print job file may be implemented by the layout file.

Further, the page layout definition described in the layout file may be described in the print job file as is, instead of the relationship with the layout file being described in the print job file, for example.

In a preferred embodiment, in response to a user request, the association means associate the name of a file of the page layout and the name of an image file of an image desired by the user.

In a preferred embodiment, the device is a digital camera and the association means perform the association during photography. In addition, in a preferred embodiment, the device further comprises: page layout display means for displaying the page layout on a viewfinder or display device; and camera visual field display means that allow a user to view the visual field of a digital camera via an image area of a page layout displayed on the viewfinder or the display device, wherein the association means associate the page layout displayed on the viewfinder or display device and an image file of the photograph taken.

The printer according to the present invention comprises means for acquiring a print job file representing a print job for printing a page on which an image is associated with an image area in a page layout containing the image area disposed on the page, and printing means that perform printing on the basis of the print job file thus acquired.

In a preferred embodiment, the printer further comprises storing means on which the layout file describing the page layout is stored.

In a preferred embodiment, the layout file describing the page layout, and the print job file are both supplied from the outside.

In a preferred embodiment, the print job file comprises a plurality of image areas which the page layout comprises and association information for placing images in the plurality of image areas; and the printing means print a page on which images are disposed in each of the plurality of image areas on the basis of the association information.

As a first example of this embodiment, area identification codes are allocated to each of the plurality of image areas of the page layout, and the print job file describes which image corresponds with which area identification code. The printing means parse the print job file to identify the relationship of correspondence between the image and the area identification codes, and are able to print the page design on the basis of this correspondence relationship. Further, for example, in this case, a plurality of area identification codes and information identifying the images corresponding with each area identification code are described in the print job file.

As a second example of this embodiment, the print job file contains layout identification information for identifying the layout file describing the page layout, and one or a plurality of items of image identification information for identifying image files for one or a plurality of images associated with one or more of the image areas. In this case, the printing means (for example, if the number of items of image identification information is equal to or less than the number of image areas contained in the page layout) place each image represented by each image file that is identified from each item of image identification information in each image area of the page layout represented by the layout file identified from the layout identification information, on the basis of the descriptive order of the image identification information, and then prints a page on which each of the images is disposed. Further, if, for example, the number of items of image identification information is greater than the number of image areas contained in the page layout, the printing means may print a plurality of types of pages on which optional images among a plurality of image files that are identified from the plurality of items of image identification information are disposed in each image area of the page layout represented by the layout file identified from the layout identification information.

In a preferred embodiment, a plurality of layout description sections are contained in the print job file and each layout description section contains layout identification information serving to identify a layout file describing the page layout, and image identification information serving to identify an image file of an image associated with an image area of the page layout. In this case, the printing means print a page on which the image is disposed on the basis of the descriptive content for each of the layout description sections.

In a preferred embodiment, the print job file contains one or more items of file identification information serving to identify each of one or more data files, and a specified code, and the one or more items of file identification information is(are) contained in a predetermined range within the print job file. Upon detecting the specified code, the printing means handle a data file, which is identified from a predetermined file identification information item among one or more file identification information items within the predetermined range, as a layout file representing the page layout, and handle a data file, which is identified from another file identification information item, as the image file of the image.

The print system according to the present invention comprises: association means for associating an image area in a page layout containing the image area disposed on a page, and a specified image; print job file creating means for creating, on the basis of the association, a print job file that renders a print job for printing a page on which the specified image is applied to the image area; and a printer that performs printing on the basis of the print job file.

The computer program according to the present invention allows a computer to execute the steps of associating an image area in a page layout containing the image area disposed on a page, and a specified image; and creating, on the basis of the association, a print job file that renders a print job for printing a page on which the specified image is applied to the image area.

The method according to the present invention is a method enabling a printer to print a page with a desired design, comprising the steps of: associating an image area in a page layout containing the image area disposed on a page, and a specified image; and creating, on the basis of the association, a print job file that renders a print job for printing a page on which the specified image is applied to the image area.

The printing method according to the present invention comprises the steps of: acquiring a print job file representing a print job for printing a page on which an image is associated with an image area in a page layout containing the image area disposed on the page ; and performing printing on the basis of the print job file.

The data structure according to the present invention is a data structure of a print job file that can be parsed by a printer, comprising: layout identification information serving to identify a layout file defining a given page layout containing one or more image areas; and image identification information serving to identify an image file of a specified image. The "identification information" referred to here is a file name, for example.

In a preferred embodiment, the image area and image identification information are associated.

In a preferred embodiment, a plurality of items of image identification information is included.

In a preferred embodiment, an identifier, which indicates a break for each page, and one or more items of image identification information that is(are) associated with the image areas of each page, are matched with respect to a single item of layout identification information.

In a preferred embodiment, there is only ever one item of layout identification information described in the print job file.

In a preferred embodiment, there is a plurality of items of layout identification information described in the print job file.

In a preferred embodiment, the print job file further comprises a description relating to printing conditions desired by a user. In addition, at least one of the page layout and the print job file is a file that is described by means of a text file or Markup language. The "markup language" is XML (eXtensible Markup language), for example.

In a preferred embodiment, a plurality of layout description sections are included, and each layout description section contains the layout identification information, and image identification information for an image associated with an image area of a page layout represented by a layout file that is identified from the layout identification information. As a result, a printer is able to print a page on which an image is disposed on the basis of the descriptive content of each of the layout description sections.

Another data structure according to the present invention is a data structure of a print job file that can be parsed by a printer, comprising: a specified code; and one or more items of file identification information serving to identify each of one or more data files, wherein the specified code allows a printer that detects the specified code to handle a data file that is identified from a predetermined file identification information item among the one or more file identification information items as a layout file representing the page layout, and to handle a data file that is identified from another file identification information item as the image file of the image.

Another data structure according to the present invention is a data structure for a print job file that can be parsed by a printer, comprising: layout identification information; and image identification information (a file name, for example) serving to identify an image file of a specified image. The layout identification information is identification information for a layout file of a page layout which is a given page layout containing one or more image areas, and in which a decorative part image is associated with a predetermined location of this page layout. This layout file may be a single file in which the page layout and a decorative part image (background or frame image or other image, for example) constitute a package. More specifically, for example, the layout file may be a file representing the drawing of a decorative part image in the page layout, and may be a file associating the image file of the decorative part image with the layout file of the page layout (identification information for the image file of the decorative part image is described in the layout file, for example).

The system according to the present invention is a data source that outputs a print job file (the print job file is saved on a storage medium such as a memory or a hard disk in the data source, for example); and a job file acquisition device for acquiring the print job file from the data source. The print job file contains layout identification information serving to identify a layout file defining a given page layout containing an image area, and image identification information serving to identify an image file of a specified image. The job file acquisition device obtains and parses the print job file that is output by the data source and acquires and saves, from the same data source or a different data source, for example, the layout file that is identified from the layout identification information contained in the print job file, as well as the image file that is identified from the image identification information contained in the print job file. Further, the transfer of the print job file between the data source and the job file acquisition device may be performed via a transportable-type storage medium (a memory card, for example), or may be performed by transmitting a command, for example.

In a preferred embodiment, the data source for outputting the print job file proactively transmits the print job file to the job file acquisition device, and the job file acquisition device proactively acquires the layout file and the image file from the data source or other data source on the basis of the print job file, and plays back the image corresponding with the image file in accordance with a page layout designated by the layout file.

Here, "proactively transmits the print job file" means that the print job file is transmitted autonomously without a request being received from the job file acquisition device, for example.

In addition, when the layout file and image file are "proactively" acquired, the data source or other data source is accessed, for example, and the layout file to be acquired is acquired (in other words, acquired via a data pull method) from the data source or other data source (more specifically, from storage where the layout file or image file to be acquired is held, for example).

In a preferred embodiment, the data source is a digital camera; the job file acquisition device is a printer; and the printer prints an image corresponding with the acquired image file in accordance with a page layout designated by the layout file thus acquired.

The data source device according to the present invention is a device that is capable of communicating with a job file acquisition device allowing a print job file to be acquired, the print job file containing layout identification information serving to identify a layout file defining a given page layout containing an image area, and image identification information serving to identify an image file of a specified image, comprising: means for preparing the print job file (means for holding the print job file in the memory of the device itself, for example); and means for outputting the print job file thus prepared to the job file acquisition device. The data source device thus enables the job file acquisition device to acquire and parse the print job file thus output and to acquire and save a layout file that is identified from the layout identification information contained in the print job file, as well as an image file that is identified from the image identification information contained in the print job file.

The job file acquisition device according to the present invention is a device that is capable of communicating with a data source on which a print job file is saved, the print job file containing layout identification information serving to identify a layout file defining a given page layout containing an image area, and image identification information serving to identify an image file of a specified image, comprising: means for acquiring the print job file that is output from the data source; and means for parsing the print job file thus acquired and for acquiring and saving a layout file that is identified from the layout identification information contained in the print job file, as well as an image file that is identified from the image identification information contained in the print job file.

The method according to the present invention is a method for acquiring a print job file containing layout identification information serving to identify a layout file defining a given page layout containing an image area, and image identification information serving to identify an image file of a specified image, comprising: a step in which a print command device proactively transmits the print job file to a job file acquisition device; and a step in which the job file acquisition device proactively acquires a layout file and image file from a data source (the same data source or a different data source, for example) on the basis of the print job file thus received from the print command device. Further, this method may further comprise a step in which the job file acquisition device plays back the image corresponding with the image file in accordance with a page layout designated by the layout file. In addition, the print command device may be combined with the data source or be a separate device.

BRIEF DESCRIPTION OF THE DRAWINGS

FIG. 2 shows a data structure of a print job file;

FIG. 3 shows an example of a description of a print job file 25;

FIG. 6 shows an example of a description of a layout definition file;

BEST MODE FOR CARRYING OUT THE INVENTION

Embodiments of the present invention will be described hereinbelow with reference to the drawings.

Figure 1:
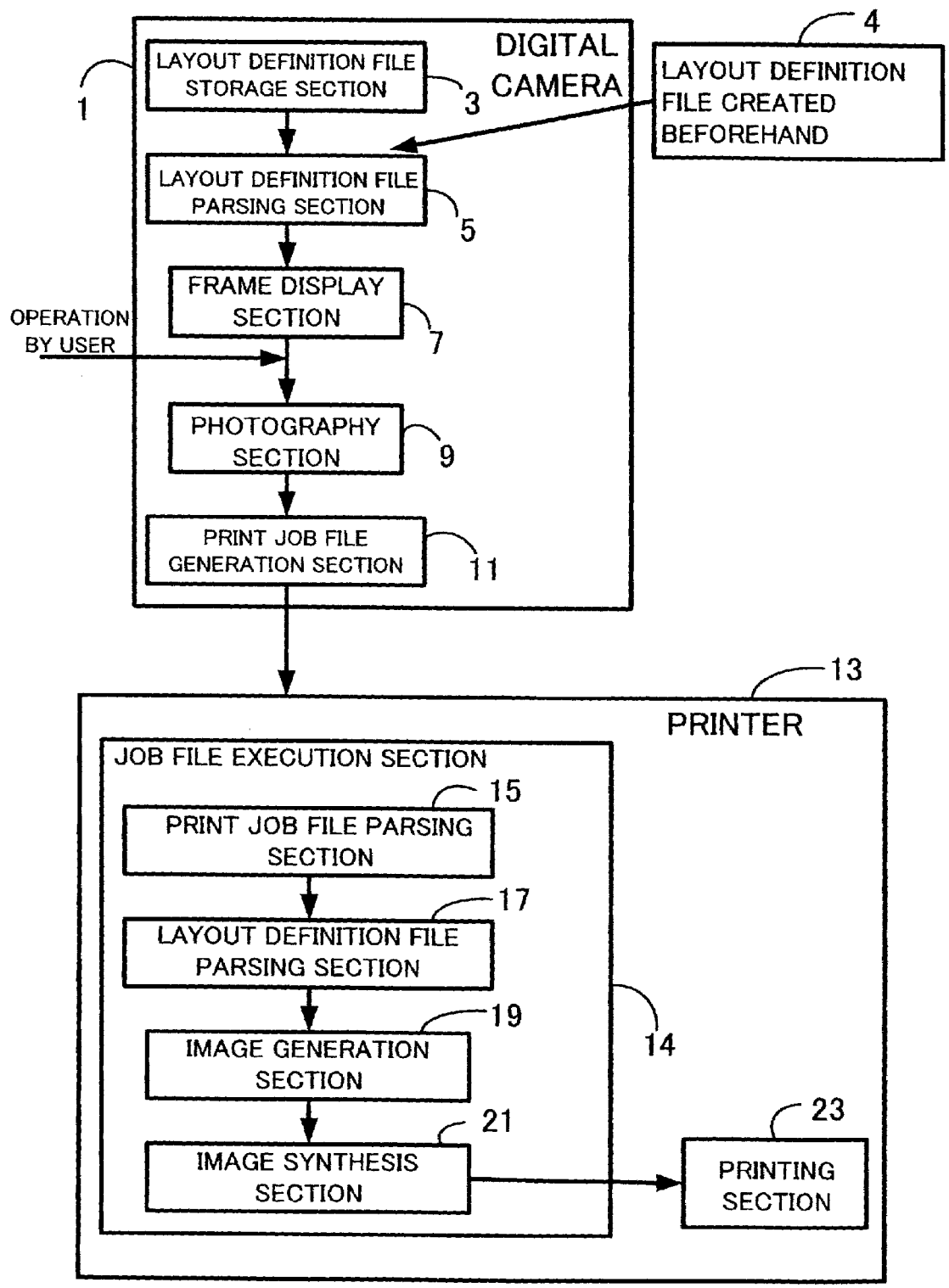
FIG. 1 is a block diagram showing a print system according to a first embodiment of the present invention.

FIG. 1 shows a print system according to a first embodiment of the present invention;

The print system according to the first embodiment is able to print a photographic image taken by means of a digital camera 1 by generating a print job of a photographic image taken by means of the digital camera 1 within the digital camera 1 and executing the print job generated there by means of a printer 13. Put differently, the printer 13 of this print system is equipped with a stand-alone machine function that makes it possible to directly (that is, not via a host device that is not illustrated) read and print an image file of a photograph in the digital camera 1 from the digital camera 1.

The digital camera 1 of this print system is equipped with a function for rendering the generated print job in a file format and outputting this file, and the printer 13 is equipped with a function for parsing the file representing the print job that is outputted by the digital camera 1 and then performing printing on the basis of the parsing result. Accordingly, because the print job is a file, the print job generated by the digital camera 1 can be recorded onto a transportable recording medium such as a memory card or MO (Magnetic Optical disk) and then taken to a desired other device (such as a personal computer, cellular phone, printer, and so forth, for example), and a print job generated by means of the digital camera 1 can be used as desired by using this device (the print job is edited, transmitted to a desired destination device by using electronic mail and WWW services and so forth, or printed, and so forth, for example).

The digital camera 1 and printer 13 of this print system will be described in detail below.

As long as the digital camera 1 of this embodiment is a device that permits the installation of a function for taking a photograph and storing an image of this photograph, the present invention can be applied to any device (that is, the present invention can be applied not only to the digital camera itself, but also to a cellular phone or PDA and so forth). The digital camera 1 comprises a layout definition file storage section 3, layout definition file parsing section 5, a frame display section 7, a photography section 9, and a print job file generation section 11.

The layout definition file storage section 3 stores layout definition files. Here, a "layout definition file" is a file that describes information relating to a page layout that contains one or more image areas. The layout definition file is a file in predetermined format, such as a text format or XML format file, for example, and in this file are described page layout keywords (such as "Christmas", "Greeting", and so forth, for example), a page layout display direction (vertical or horizontal direction, for example), attribute information for each image area in the page layout (such as the photo ID (described subsequently), the degree of rotation of the inserted image, the alignment method, the fitting regulations, and the devices, for example), and the like. Further, when, among a plurality of image areas which is contained in the page layout, inserted photographs and images of decorative parts are determined beforehand, image file pointers for these images (file names and path names, for example) are also described in the layout definition file (the layout definition file will be described in detail subsequently). Further, here, a "decorative part" signifies parts that can be utilized as a decorative part for the page layout such as a background, a decorative frame, an illustration, as well as other text, graphics, designs and patterns, for example.

The layout definition file parsing section 5 reads the layout definition file from the layout definition file storage section 3 and parses this layout definition file. The layout definition file parsing section 5 is also capable of parsing a layout definition file that is input to the digital camera 1 from the outside (more specifically, a layout definition file that is created or edited using predetermined software) 4.

In response to the result of the parsing by the layout definition file parsing section 5, the frame display section 7 generates a page layout on the basis of the parsing result, and displays the page layout on a viewfinder or display screen of the digital camera 1 (not displayed together). As a result, the image that is displayed via an image area in the page layout displayed on the viewfinder or display screen is the visual field of the camera, or, in other words, an image of the photograph which is inserted in the image area as a result of taking a photograph. Here, when a plurality of image areas (that is, image areas in a vacant state) in which an image can be inserted is present in the displayed page layout, the frame display section 7 receives a selection of an image area desired by the user among the plurality of image areas from the user, and the visual field of the camera may be displayed via the image area thus selected by the user (that is, photographic images in a quantity that is the same as that of the image areas may be applied to a single page layout). Moreover, the visual field of the camera may be displayed via the entire plurality of image areas (that is, even when there is a plurality of image areas, only a single photographic image may be applied to a single page layout).

In response to a photographic operation by the user, the photography section 9 stores a photographic image that mirrors the visual field of the camera at this point in time, and holds the photographic image in a predetermined location (memory that is built into the digital camera 1, for example) by rendering the photographic image as an image file of a predetermined format (JPEG format, for example).

The print job file generation section 11 generates a file format print job as described below. That is, when a photograph is taken in a state where the camera field is displayed on the viewfinder or display screen via an image area of the page layout, the print job file generation section 11 selects the image of the photograph taken in this state as the image inserted in the image area displayed on the viewfinder or display screen ("target image area" below). Then, the print job file generation section 11 generates a print job by using the layout definition file of the page layout currently displayed, and the image file of the photographic image thus selected, and then generates a print job file on the basis of this print job. The print job file thus generated is transferred to the printer 13 via a cable that connects the digital camera 1 and the printer 13 with predetermined timing (when the digital camera 1 receives a print job file transfer command from the user, for example). Alternatively, the print job file thus generated is held on a transportable recording medium such as a memory card that is installed in the digital camera 1, and is captured by the printer 13 as a result of the user removing the transportable recording medium from the digital camera 1 and installing this medium in the printer 13.

Here, a "print job file" is a file in a predetermined format, such as a text format or XML format file, for example. The print job file is a file that describes at least the relationship with the layout definition file defining the page layout (layout identification information serving to identify the layout definition file, for example) and the relationship with the image file of the photographic image (image identification information serving to identify the image file, for example). For example, once the printer has parsed this print job file, the printer acquires the page layout and a specified image on the basis of the relationship described in this print job file and is thus able to print a page design in which the specified image is applied to an image area in the page layout.

Further, all or part of the printing conditions (paper type, size, number of prints, and the image correction method, and so forth, for example) that are required for printing, for example, may be described in the print job file. When part of the print conditions are described, the remaining printing conditions are stored in a predetermined data source (one example is a recording medium such as memory in the printer), for example, and the printer is thus able to execute printing on the basis of partial printing conditions that are described in the print job file, and the remaining printing conditions described in the predetermined data source.

The printer 13 comprises a job file execution section 14, and printing section 23, and the job file execution section 14 comprises a print job file parsing section 15, a layout definition file parsing section 17, an image generation section 19, and an image synthesis section 21. When a transportable recording medium, for example, is installed in the printer 13, same automatically starts to search within the transportable recording medium, and once the storage of the print job file is detected as a result, the printer 13 is able to execute the print job by automatically parsing the print job file.

The print job file parsing section 15 parses the print job file that has been captured by the printer 13 (more specifically parses the relationship between the print job file, the layout definition file, and the image file).

In response to the result of the parsing by the print job file parsing section 15, the layout definition file parsing section 17 parses the layout definition file that is associated with the print job file on the basis of the parsing result.

In response to the result of the parsing of the layout definition file parsing section 17, the image generation section 19 generates each image to be applied to each target image area in the page layout described in the layout definition file on the basis of the print job file parsing result and the layout definition file parsing result (acquires the image in each image file by opening each image file if the image file of each image is a JPEG-format image file, for example).

In response to the operation of the image generation section 19, the image synthesis section 21 generates the entire page design by synthesizing each image generated by the image generation section 19 with each target image area in the page layout described in the layout definition file on the basis of the print job file parsing result and the layout definition file parsing result. Furthermore, when image editing conditions such as the method for correcting each image are set, the image synthesis section 21 processes each image on the basis of each image editing condition (raises the image brightness and so forth, for example).

The printing section 23 prints the full page design generated by the image synthesis section 21 on the basis of the result of parsing the print job file (for example, when the paper size, which constitutes a printing condition in the print job file, is described as "A4", the full page design may be printed on A4-size paper or in accordance with the designated paper size in the layout file).

The digital camera 1 and printer 13 of the print system according to the first embodiment were described above. Here, a detailed description is provided for the above-described print job file and the layout definition file.

FIG. 2 shows the data structure of the print job file.

As shown in this figure, a layout definition file 33 and one or more photograph image files 35A, 35B, and 35C (three in the illustrated example), which constitute associated files 32, are associated with the print job file 25. When one or more decorative parts, which are to be applied to the page layout described in the layout definition file 33, are determined, an image file 34 for one or more (one in the example shown) decorative parts is associated with the layout definition file 33 (the image in the decorative part image file 34 may be an image in vector format or an image in raster format).

Header information 27, job parameters 29, and job data 31 are described in the print job file 25, and contained in the description of the job data 31 are a description of the relationship with the layout definition file 33 (hereinafter the "layout definition file pointer"), and a description of the relationship with the photograph image files 35A, 35B, and 35C (image file pointers).

FIG. 3 shows an example of the description of the print job file 25.

As described earlier, the print job file 25 is a file in text format, for example, and the file 25 describes the header information 27, one or more job parameters 29A, 29B, and one or more job data 31A, 31B. Further, the print job file 25 illustrated in this example describes two print jobs, and therefore describes two job data 31A and 31B.

The header information 27 is information which is described at the head of the print job file 25. The version and so forth of the print job file 25, for example, is contained in the header information 27.

The job parameters 29A, 29B are printing conditions for two print jobs, one each of which is described for each print job. Stated otherwise, the printing conditions can be established for each print job (further, common printing conditions can also be set for a plurality of print jobs). The job parameters 29A, 29B are information on the printing conditions thus established, and, for example, as exemplified by FIG. 3, have information on the paper type (shown as "Paper Type"), information on the paper size (shown as "Paper Size"), and information on the page layout ("shown as "Layout").

Here, the "paper type information" is the paper type set as a printing condition, there being a variety of settable paper types, such as "ordinary paper", "glossy paper", OHP sheets, sticker paper, and so forth, for example. Similarly, "paper size information" is the paper size which is set as a printing condition (that is, the paper size for printing the full page design), and, as the "settable paper size", there are a variety of paper sizes, such as postcard size, A4, A3, A4 roll paper, 2L, and L, for example. "Page layout information" is the above-described layout definition file pointer, that is, information on the relationship between the print job file 25 and the layout definition file 33 (file describing the page layout) 33. More specifically, this is the file name for the layout definition file 33 (shown as "100.usd", "200.usd") and the relative path name, for example (here, the so-called "relative path" is the path from the location of the print job file 25 that affords access to the layout definition file 33; in the illustrated example, because the print job file 25 and the layout definition file 33 are stored in the same folder, only the file name of the layout definition file 33 is described as the layout definition file pointer). Further, instead of the relative path name, an absolute path name that can be used regardless of the device used, such as the URL (Uniform Resource Locator), for example, can also be adopted.

Furthermore, although not illustrated in FIG. 3, as the settable printing conditions, a variety of conditions such as the print mode (normal print, interlaced print, and the like, for example), the number of prints (how many prints), the number of print copies (how many print copies), the print quality (high quality, best quality, high speed, print speed priority, image quality priority, and so forth), area code, existence of trimming, existence of cut lines (whether perforations are included, for example), the existence of camera information printing, the existence of paper cutting, valid time information (at what times printing is permitted), and so forth.

Information relating to the image file associated with the print job file 25 is described in the job data 31A, 31B. "Image file-related information" is the above-described image file pointer, that is, information that includes information on the relationship between the print job file 25 and the image files 35A, 35B, and 35C, and image editing conditions (described later) for each image in the image files 35A, 35B, and 35C. It can be seen from the illustrated example that, in the case of two print jobs, three image files 35A, 35B, and 35C are normally used.

The image file pointer is, more specifically, the file name (shown as "DSC00001.JPG", for example) for each of the image files 35A, 35B, and 35C, and the relative path name (shown as "¥DCIM¥100SAND¥", for example), for example (here, the so-called "relative path" is the path from the location of the print job file 25 that affords access to the image files 35A, 35B, and 35C). Naturally, instead of the relative path name, the above-described absolute path name may be adopted.

The image editing conditions can be set for each of the image files 35A, 35B, and 35C. Settable image editing conditions include, for example, scene correction (which scene-adapted color tone correction is performed), brightness adjustment (the brightness to be set), clarity adjustment (the clarity to be set), zoom (to what extent the image is enlarged or reduced), and so forth. In addition, the settable image editing conditions may include usage filter conditions with respect to which filter is applied to the image among filters such as a filter serving to render a black and white monochrome image or a filter serving to render a sepia tone.

The ranking order of the image file pointer in the descriptions of the job data 31A, 31B has an influence on which image area in the page layout that the image in the image file indicated by the image file pointer is applied to. More specifically, a unique number or code (this is referred to as the "photo ID" hereinafter) is assigned to each image area in the page layout, for example, and the image of each image file associated with the print job file 25 is applied to the image area in the page layout on the basis of the ranking order of the image file pointer.

Figure 4:
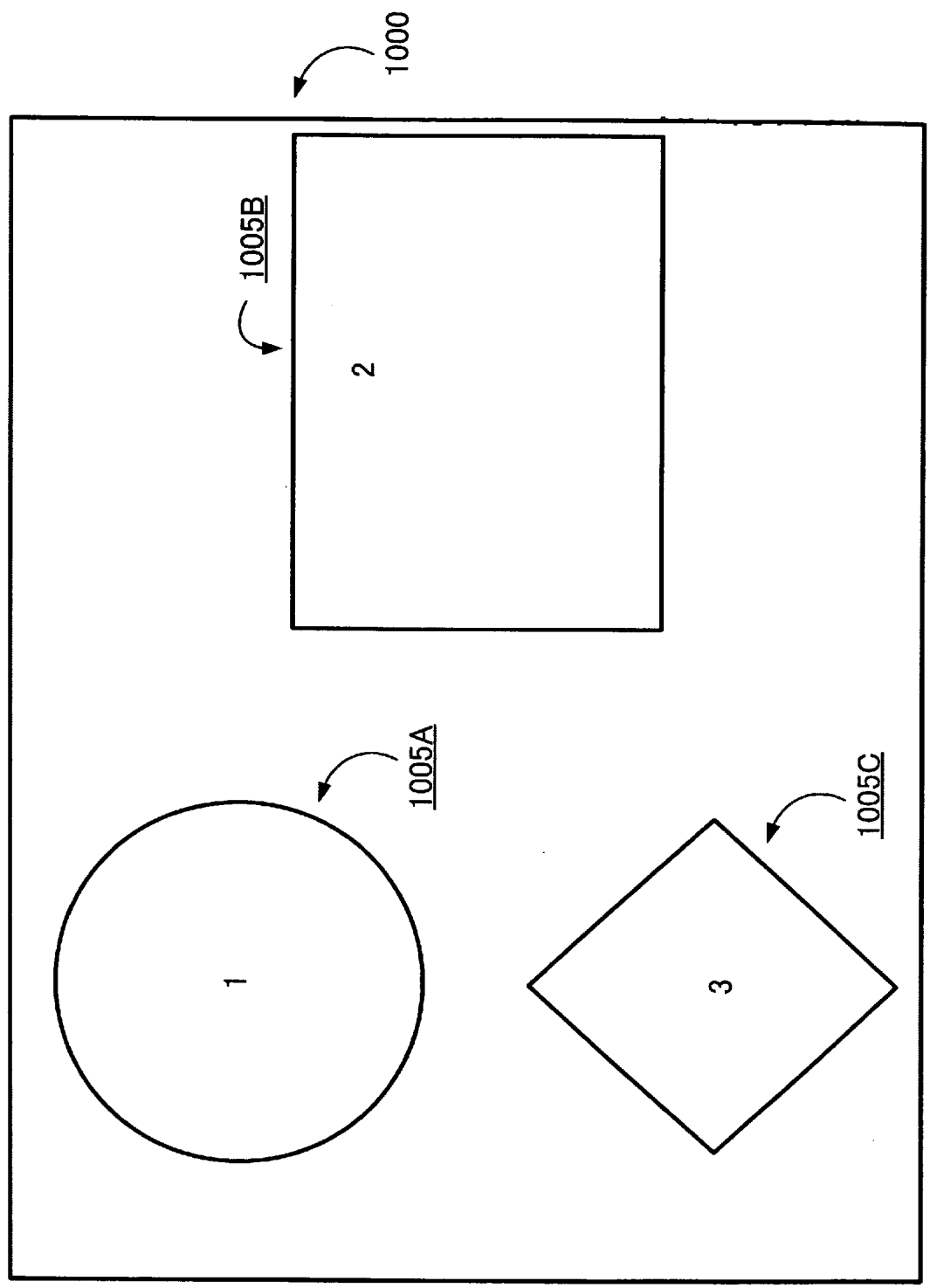
FIG. 4 shows an example of a page layout.

For example, suppose that the page layout with the file name "100.usd" described by the job parameter 29A is a page layout 1000 with three image areas 1005A to 1005C, as shown in FIG. 4. The photo ID "1" is then assigned to the image area 1005A, the photo ID "2" to the image area 1005B, and the photo ID "3" to the image area 1005C.

In this case, according to the description of the job data 31A corresponding with the job parameter 29A, at the time of the image synthesis by the image synthesis section 21, the images in the three image files 35A, 35B, and 35C are applied as described below to the three image areas 1005A to 1005C of the page layout 1000 (images corresponding with the image file pointer described on the Nth occasion (where N is the number of adjustments) is referred to hereinafter as the "Nth image". That is, the first image (the image with the file name "DSC00001.JPG") is inserted in the image area 1005A to which the photo ID "1" has been assigned, the second image (the image with the file name "DSC00002.JPG") is inserted in the image area 1005B to which the photo ID "2" has been assigned, and the third image (the image with the file name "DSC00003.JPG") is inserted in the image area 1005C to which the photo ID "3" has been assigned. That is, a plurality of photographic images desired by the user is applied in a one-to-one relationship to the three image areas 1005A to 1005C of the page layout 1000.

Naturally, the method of applying the photographic images to the page layout is not limited to or by the method described above. For example, a plurality of image files may be applied to the same image area.

More specifically, when only the image area with the photo ID "1" and the image area with the photo ID "2" are present in the page layout, for example, the first image and third image may be applied to the image area with the photo ID "1" or the second image and third image may be applied to the image area with the photo ID "2" (in the former case, a page design in which the first image is applied to the image area with the photo ID "1" and the second image is applied to the image area with the photo ID "2", and a page design in which the third image is applied to the image area of the photo ID "1" and the second image is applied to the image area with the photo ID "2" (or the image area with the photo ID "2" is blank) are generated).

In addition, for example, when only the image area with the photo ID "1" is present in the page layout (that is, when only one image area is present), the first to third images are applied to the image area with the photo ID "1". In this case, three page designs in which the first to third images are each applied to the same image area in the same page layout are generated.

Figure 5:
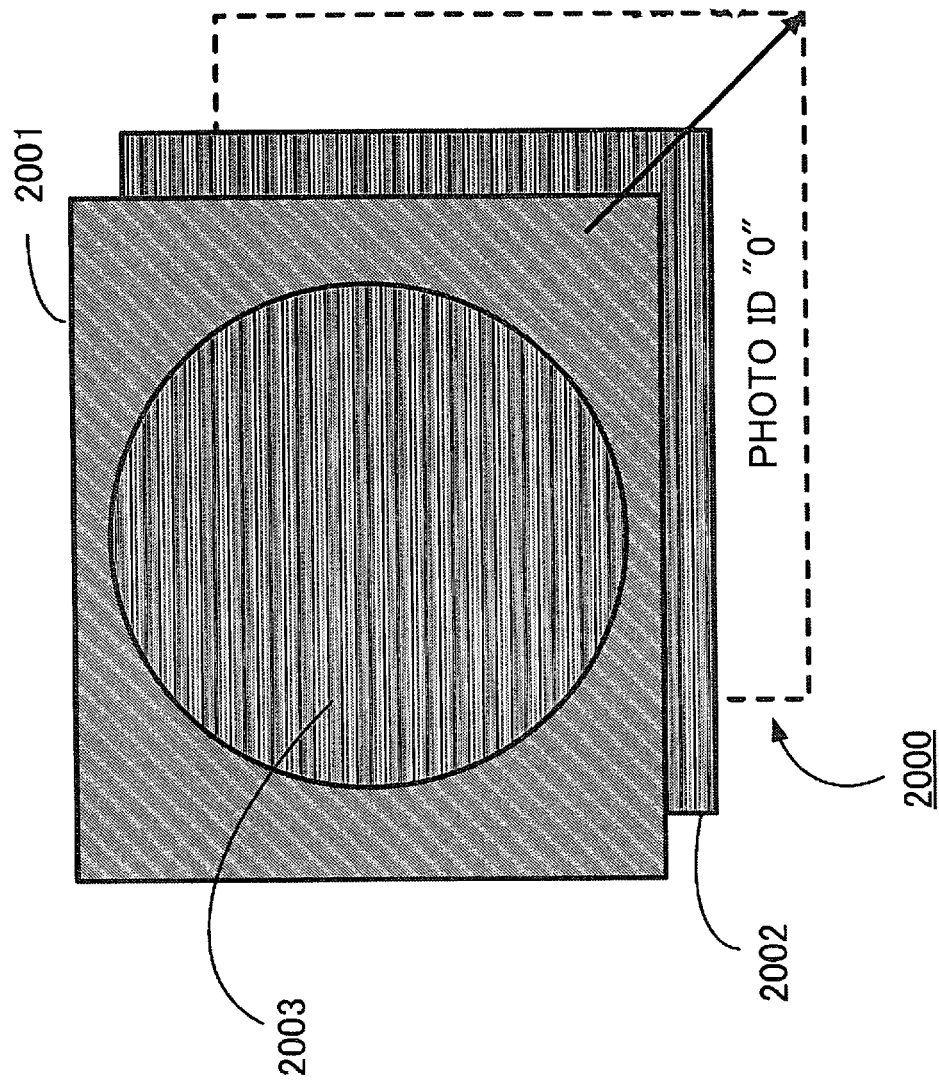
FIG. 5 shows an example of an aspect in which two or more images are applied to the same image area.

Furthermore, for example, as will be described subsequently, because the images have already been applied, a description can also be provided in the layout definition file 33 so that the images of the image file desired by the user are also applied to the image area whose photo ID is "0". In this case, as shown in FIG. 5, for example, two or more images 2001 and 2002 are printed on top of each other in the same image area 2000. Here, for example, information relating to area 2003, which is displayed so as to be transparent (such as the position, degree of transparency, and the like, of the area, for example) is described in the image file of at least one image 2001 of the two or more images.

A description was provided above for the print job file 25 describing the print job. Further, the print job file 25 in FIG. 3 is a basic example. The present invention is not limited to or by this example. The print job file 25 describes a desired number of print jobs of the one or more print jobs, and the one or more layout definition files and one or more image files can be freely associated (for example, two or more print jobs may be described with respect to one layout definition file, and one print job may be described with respect to two or more layout definition files). Further, files of a type other than an image file (sound files, for example) may also be associated.

Next, a layout definition file, which is a file describing the page layout, will be described.

FIG. 6 shows an example of the description of the layout definition file.

As shown in FIG. 6, header information 300 and page information 301 are described in the layout definition file 33.

Information relating to the layout definition file 33 is contained in the header information 300. More specifically, for example, the header information 300 contains "HdKeyWord", "HdDirection", "HdSound", "HdThumbnail", "HdPhysicalPaperSize", and "HdMargines", and so forth.

"HdKeyWord" is keyword information, that is, a specified keyword or a keyword desired by the user which relates to the page layout, such as "Christmas" and "Greeting", and the like, for example (the keyword information is not limited to or by half-width English alphanumeric characters. Preferred text code can be adopted). Because keywords are described in the layout definition file 33, it is possible to search the layout definition file in which a desired page layout is described from among a multiplicity of layout definition files by using a desired keyword.

"HdDirection" is information on the page layout display direction, that is, the orientation of the page layout when same is displayed on the viewfinder or display screen of the digital camera 1 or printed. Such orientations include a vertical and horizontal orientation, for example.

"HdSound" is sound file information, that is, a sound file pointer that is associated with the layout definition file 33, more specifically, the file name of the sound file, for example (shown as "GSOUND.PCM", for example), and the relative path name ("¥EPUDL¥", for example) (or may be an absolute path name rather than a relative path name). Here, a sound file can be associated with the layout definition file 33 (or a print job file 25). For example, when the print job file 25 associated with the layout definition file 33 is output to the outside, the sound file associated with the layout definition file 33 can also be output. The sound file is played back at a predetermined time. For example, the sound file is played back automatically when the page layout described in the layout definition file 33 is displayed on the viewfinder or similar of the digital camera 1, and when a page design containing the page layout is printed, and so forth.

"HdThumbnail" is thumbnail information, that is, a pointer which is associated with the layout definition file 33 and which is for image files of page layout thumbnail images, more specifically, for example, the file name of the image file (shown as "001UDL.USF", for example) and the relative path name ("¥EPUDL¥IMAGE¥", for example) (or may be an absolute path name instead of a relative path name). In this embodiment, the thumbnail images for the page layout described in the layout definition file 33 can be created by using a specific device (personal computer, cellular phone, digital camera, printer, and so forth). By creating thumbnail images for the page layout, a plurality of page layouts can be rendered as a list and displayed on the display screen and printed, and hence a desired page layout can be sought easily. In this respect, similar results are obtained if thumbnail images are created for a full page design by means of the same method.

"HdPhysicalPaperSize" is physical page size information, that is, when a page layout is printed, this is information on the paper size when there is a complete match with the size of the page layout, and substantially represents the size of the whole page layout.

"HdMargines" is print margin information, that is, information indicating the extent of the margins left in the printing of the page layout on the print paper. For example, the illustrated "3,3,3,3" signifies printing to produce 3 mm margins at the top and bottom and left and right edges of a square piece of paper. Further, the numerical values for the print margins are not limited to positive values and may be zero or negative values (in this case, printing in which no margins whatever are formed is carried out).

Information relating to the page layout attributes is contained in the page information 301, and is "Draw Picture", "Draw Strings", and "Draw Line", for example. "Draw Picture" describes information relating to an image contained in the page layout, "Draw Strings" describes information relating to text contained in the page layout, and "Draw Line" describes information relating to lines contained in the page layout. However, this is one example and there is no need to limit the page information 301 to this example. For example, information relating to an image may be described in part of "Draw Strings" instead of or in addition to text-related information. "Draw Picture", "Draw Strings", and "Draw Line" will be described in detail below.

"Draw Picture" is information relating to an image area, each code or code group in the "Draw Picture" description representing, for example, in order starting from the left, an image file pointer, a photo ID, and an image area external form, the degree of rotation, fitting rules, and alignment rules.

In other words, in the upper and lower "Draw Picture" descriptions, the description "¥EPUDL¥IMAGE¥001.EFF" on the far left, which is between "" and "",x represents the image file pointer ("Draw Picture" descriptions include one in which an image file pointer does not appear, as per the upper description, and one in which an image file pointer appears, as per the lower description, but this will be described later). The image file pointer indicates the direct relationship between the layout definition file 33 and a file for a target image applied to the image area, and is, more specifically, for example, the file name of this file (shown as "001.EFF") and a relative path name (shown as "¥EPUDL¥IMAGE¥) (here, the so-called "relative path" is the path when the file of the target image is accessed from the location where the layout definition file 33 is stored, and the above-described absolute path name may be adopted instead of the relative path name). That is, when a background image or other image, which is applied to an image area of the page layout, is determined beforehand, the image file pointer is described as per the lower "Draw Picture" description in the figure (further, the type of image applied can be identified by the extension of the file name, for example; to cite a specific example, the extension "EFF" makes it possible to identify a background image). On the other hand, when a background image or other image, which is applied to an image area of the page layout, is not determined beforehand (that is, if the image area is in a vacant state), the image file pointer is not described, as per the upper "Draw Picture" description in the figure. In this case, the image of the image file associated with the print job file 25 is applied to this image area at the time of the image synthesis of the image synthesis section 21 (See FIG. 1).

Further, in the upper and lower "Draw Picture" descriptions, the adjoining code "1" or "0" on the right-hand side of the above-described image file pointer description represents the photo ID of the image area. Here, an undefined photo ID, such as a photo ID that is an integer of one or more, for example, is allocated to an image area for which an applied image is undefined. On the other hand, a photo ID indicating a defined image, such as a zero photo ID, for example, is allocated to an image area whose applied image is defined. In other words, in this example, the device for parsing the layout definition file 33 is capable of ascertaining, depending on whether or not the photo ID is an integer of one or more, whether or not each image area in the page layout indicated by the layout definition file 33 is in a vacant state.

In the upper and lower "Draw Picture" descriptions, an adjoining code group "50, 100, 1500, 1200" or "10, 20, 100, 200" on the right-hand side of the photo ID description represents the external shape of the image area (and/or the position on the page layout). Here, the correlation "first x coordinate, first y coordinate, second x coordinate, second y coordinate" applies, and it can therefore be seen that each image area is square (further, the coordinates here are coordinates when a predetermined position on the page layout (a point at the top left, for example) is the starting point). Naturally, the external shape of the image area is not limited to a square, a variety of shapes being acceptable, such as a polygon, a perfect circle, an ellipse, and so forth. In addition, the method for indicating the external shape of an image area is not limited to a method in which coordinates are described, and may be a function expression indicating a visible outline, for example.

In the upper and lower "Draw Picture" descriptions, the adjoining code "4" or "0" on the right-hand side of the description of the image area external shape is the degree of rotation, that is, represents to what extent the image applied to the image area is rotated. The degree of rotation can be set in a predetermined range (0 degrees to 360 degrees, for example).

In the upper and lower "Draw Picture" descriptions, the adjoining code "0" or "1" on the right-hand side of the description of the degree of rotation is the fitting rule, that is, indicates a rule with regard to how an image in an image file is applied to an image area. Fitting rules include, for example, one according to which an image is applied as is, regardless of whether or not margins are produced in the image area, or a rule according to which an image is applied to the image area without the generation of margins so that the range desired by the user is displayed while maintaining the height to width ratio desired by the user, and so forth.

In the upper and lower "Draw Picture" descriptions, an adjoining code "5" or "4" on the right-hand side of the description of the alignment rule indicates an alignment rule, that is, a rule with regard to which position on the image is aligned with which position on the image area. Alignment rules include, for example, a top left alignment (that is, a point in the top left of the image is aligned with a point in the top left of the image area), and a central alignment (that is, the center of the image is aligned with the center of the image area), and so forth.

"Draw Strings" is information relating to a part decorated with text, graphics, and so forth, which is applied to a position desired by the user or a predetermined position, and the structure of the "Draw Strings" differs according to what kind of decorative part is applied to the page layout. The types of decorative parts can be identified by a computer by means of a variety of methods. For example, these parts can be identified by a file name extension (to cite a specific example, a background image is identified via the extension "EFF"), and can be identified by the structure of the description and so forth. Here, in the illustrated example, each code or code group in the "Draw Strings" description represents, for example, in order starting from the left, used image information, a photo ID, first decorative part information, decorative part usage position information, and second decorative part information, and the decorative part to be used can be identified by a computer from the content of the description.

In the "Draw Strings" description, ". . . ¥EPUDL¥IMAGE¥001.EFF" is used image information, that is, an image file pointer that is used for a decorative part application, and, more specifically, for example, the file name of the image file (shown as "001.EFF") and a relative path name (shown as "¥EPUDL¥IMAGE¥").

In the "Draw Strings" description, the adjoining code "0" on the right-hand side of the description of the used image information represents the photo ID of the image area. In this example, because the decorative part applied to the image area is defined, "0" is used as the photo ID for the reason described earlier.

In the "Draw Strings" description, the adjoining code group "%G,%d,%y" on the right-hand side of the description of the photo ID is first decorative part information, and more specifically indicates the details of the decorative part. In this example, the above-described code group "%G,%d,%y" represents text indicating the date the image was taken in the image file described as used image information. Further, naturally, a text group desired by the user can also be applied in place of the text indicating the photography date.

In the "Draw Strings" description, the adjoining code group "100, 200, 200, 300" on the right-hand side of the description of the first decorative part information is decorative part usage position information, that is, indicates the position in which the decorative part whose details are indicated by the first decorative part information is applied. In this example, the correlation "first x coordinate, first y coordinate, second x coordinate, second y coordinate" applies, and it can therefore be seen that the decorative part usage position is a square region. Naturally, the decorative part usage position is not limited to a square, a variety of shapes being acceptable, such as a polygon, a perfect circle, an ellipse, and so forth. In addition, the method for indicating the decorative part usage position is not limited to a method in which coordinates are described, and may be a function expression indicating a visible outline, for example.

In the "Draw Strings" description, the adjoining code group "Mincho", 0, 128, 128, 128" on the right-hand side of the description of the decorative part usage position information is second decorative part information and indicates an attribute of the decorative part applied, for example. In this example, the attribute is a text attribute that indicates the photography date on which the image was inserted into the above-described decorative part usage position and more specifically represents a description of text indicating the photography date with the font "Mincho", an 8-point pitch, and color in which each RGB color is afforded 128 values.

The "Draw Line" is information relating to a line applied to the page layout. The first to fourth "Draw Line" descriptions are structurally the same, and therefore a description will be provided here with reference to the first "Draw Line" description.

The code group "10, 20, 10, 200" on the far left in the "Draw Line" description indicates the coordinates of both ends of the line applied. In this example, the correlation "first x coordinate, first y coordinate, second x coordinate, second y coordinate" applies, and it can therefore be seen that the line is drawn from coordinate (10, 20) toward the coordinate (10, 200).

The adjoining code "5, 255, 0, 0" on the right-hand side of the coordinate code in the "Draw Line" description (that is, the coordinates of both ends of the line applied) indicates attribute information for the applied line. In this example, the thickness and color of the line are represented. More specifically, it can be seen from this attribute information that the line thickness is 5 points, and the line color is a color for which R is 255, G is 0, and B is 0.

The layout definition file 33 describing the page layout was described above. Further, the layout definition file 33 appearing in FIG. 6 is one main example, the layout definition file 33 not being limited to this example.

Further, referring once again to FIG. 1, the process flow according to the first embodiment up until the full page design is printed will be described.

First of all, in the case of the digital camera 1, at predetermined timing (for example, when the power of the digital camera 1 is turned on, and when the photography mode is set, and so forth), the layout definition file parsing section 5 reads the layout definition file from the layout definition file storage section 3 or reads a layout definition file 4 from an external device (a transportable recording medium installed in the digital camera 1, for example), and then parses the layout definition file thus read. Then, the frame display section 7 generates the page layout on the basis of the parsing result, and displays this page layout on the viewfinder or display screen of the digital camera 1 (not shown together).

Thereafter, when a photography operation is performed by the user in a state where the page layout is displayed on the viewfinder or display screen, the photography section 9 stores a photographic image that mirrors the visual field of the camera at this point in time, and renders this photographic image as an image file of a predetermined format (JPEG format, for example) and holds this image file in a predetermined location (such as memory in the digital camera 1 or a transportable recording medium installed in the digital camera 1, for example).

Next, the print job file generation section 11 selects the photographic image thus taken as the image inserted in the image area displayed on the viewfinder or display screen (that is, the "target image area"). Then, the print job file generation section 11 generates a print job file by using the layout definition file of the page layout currently displayed, and the image file of the photographic image thus selected. The print job file thus generated is transferred from the digital camera 1 to the printer 13.

Thereafter, the print job file parsing section 15 in the printer 13 parses the print job file from the digital camera 1, and more specifically parses the relationship between the print job file, the layout definition file, and the image file. Then, the layout definition file parsing section 17 parses the layout definition file associated with the print job file on the basis of the result of the parsing of the print job file. In addition, the image generation section 19 generates each image to be applied to each target image area in the page layout described in the layout definition file on the basis of the result of parsing the print job file and the result of parsing the layout definition file.

Thereafter, the image synthesis section 21 generates the full page design by synthesizing each generated image with each target image area in the page layout on the basis of the print job file parsing result and the layout definition file parsing result. Then, the printing section 23 prints the full page design thus generated on the basis of the printing conditions described in the print job file.

Within the printer 13, the process flow after the parsing of the layout definition file up until printing is performed is repeated until all the print jobs described in the print job file have been executed.

According to the first embodiment described above, the print job of the full page design is a file referred to above as the print job file 25 of this embodiment, and this file associates the page layout, the photographic image, and the decorative parts (decorative frame or insert, and so forth, for example), which constitute the full page design, in a file format. For this reason, only items which are desired among the print jobs, page layout, photographic images, and decorative parts are recorded onto a transportable recording medium and can then be carried around and transmitted to a desired other device by using electronic mail and WWW services and so forth (such as a personal computer, PDA, digital camera, cellular phone, and so forth, for example), and so on.

In addition, according to the first embodiment described above, the page design to be printed is described by means of separate files such as the print job file 25, the layout definition file 33, and the image files 35A to 35C. For this reason, the page design can be easily modified by editing or modifying the content of the individual files. For example, if there is a desire to modify the image to be inserted in the image area itself, the image files 35A to 35C for this image themselves or the image file identification information described in the print job file 25 (the image file name and path, for example) may be modified. Furthermore, if the page layout is modified, the layout definition file 33 itself or the layout identification information described in the print job file 25 (the layout definition file name and path, for example) may be modified. In addition, if there is a desire to modify the print job, the print job file 25 may be modified.

In addition, according to the first embodiment described above, the layout definition file 33 and image files 35A to 35C are not "directly" associated, being instead associated "indirectly" via the print job file 25. For this reason, by modifying the content of the print job file 25 (the layout definition file pointer and the image file pointer, for example), the correspondence between the page layout and the image can be modified, and, by modifying the content of the layout definition file 33, the page layout alone can also be modified. In addition, by modifying the substance of the image files 35A to 35C, it is also possible to modify only the image. In other words, there is a high degree of freedom in the modification of the page design. It is also possible to create new page designs by dividing these files into separate files and sending same to different devices and then combining these files with other files in each different device. For example, it is possible to send, to different devices, only the print job file 25, only the layout definition file 33 or image files 35A to 35C associated with the print job file 25, only the image file 34 of the decorative parts (or photographic images) associated with the layout definition file 33, or two or more desired files among these files.

Further, in the above-described modification of the various types of files, because the print job file 25 and the layout definition file 33 are text files, each file 25 or 33 can be edited by using a text editor, and, preferably, dedicated editing software may be used (called "dedicated editor" hereinafter).

The dedicated editor can be installed on devices such as a personal computer, a cellular phone, or a PDA. For example, when the image files 35A to 35C, and the layout definition file 33, and so forth, are exchanged with other files, the dedicated editor makes it possible identify a pointer for a separate file (that is, a file name and relative path name) and then automatically modify the content of the print job file 25 by using this pointer.

Further, according to the above-described first embodiment, when a photograph is taken, a selected page layout is displayed on the viewfinder or display screen of the digital camera 1, and the user is able to view the visual field of the camera via an image area of the page layout. It is therefore easy to take a photograph that favorably matches the page layout. Moreover, because this photograph is automatically selected as the photograph to be applied to the page layout, the user is spared the labor involved in determining the page design. Naturally, the selected photograph may be modified subsequently.

In addition, according to the above-described first embodiment, by selecting a layout definition file desired by the user from among a plurality of layout definition files when such a plurality exists, selecting a desired image file from among a plurality of image files when such a plurality exists, and then associating the layout file and image file which have been selected, a desired page design in which a desired image is inserted in a desired page layout may be completed. In this case, the page design is completely described by setting the print job file, layout file, and image file. However, printing can be executed by inputting these file settings in a printer system (for example, setting a printer capable of parsing the file settings, or a printer and a printer driver program capable of parsing the file settings).

In addition, according to the first embodiment, the page layout described by the layout definition file 33 can be made to contain not only an image area for the subsequent insertion of an image optionally selected by the user, for example, but also a separate image area in which an image of a decorative part such as a decorative frame, text, and so forth, for an image selected by the user is inserted. In this case, the image file 34 rendering the image of the decorative part exists separately from the layout definition file 33 and is associated with the layout definition file 33. The layout definition file 33 and the decorative part image file 34 are input together to the digital camera 1 or printer 13 and can then be output from the digital camera 1 or printer 13. Because the decorative part image file 34 is a file distinct from the layout definition file 33, modification of the decorative part is also straightforward by modifying the content of the image file 34.

A description of the first embodiment was provided above. Further, in the case of the first embodiment, there may normally be only one file name for the layout definition file described in the print job file. In addition, the relationship between the image area in the page layout and the file name of the image file may be described in the print job file. Also, when a plurality of pages is printed for the same print job file, identifiers indicating each page break (that is, for the start and end of printing) may be described in the print job file. These identifiers may, for example, be [JobData.Start] and [JobData.End] shown in FIG. 3, for example.

Next, the second embodiment will be described. In the description below, the differences from the first embodiment will mainly be described, descriptions for the first embodiment and duplicate descriptions being omitted or simplified (the same is also true for the third embodiment below).

Figure 7:
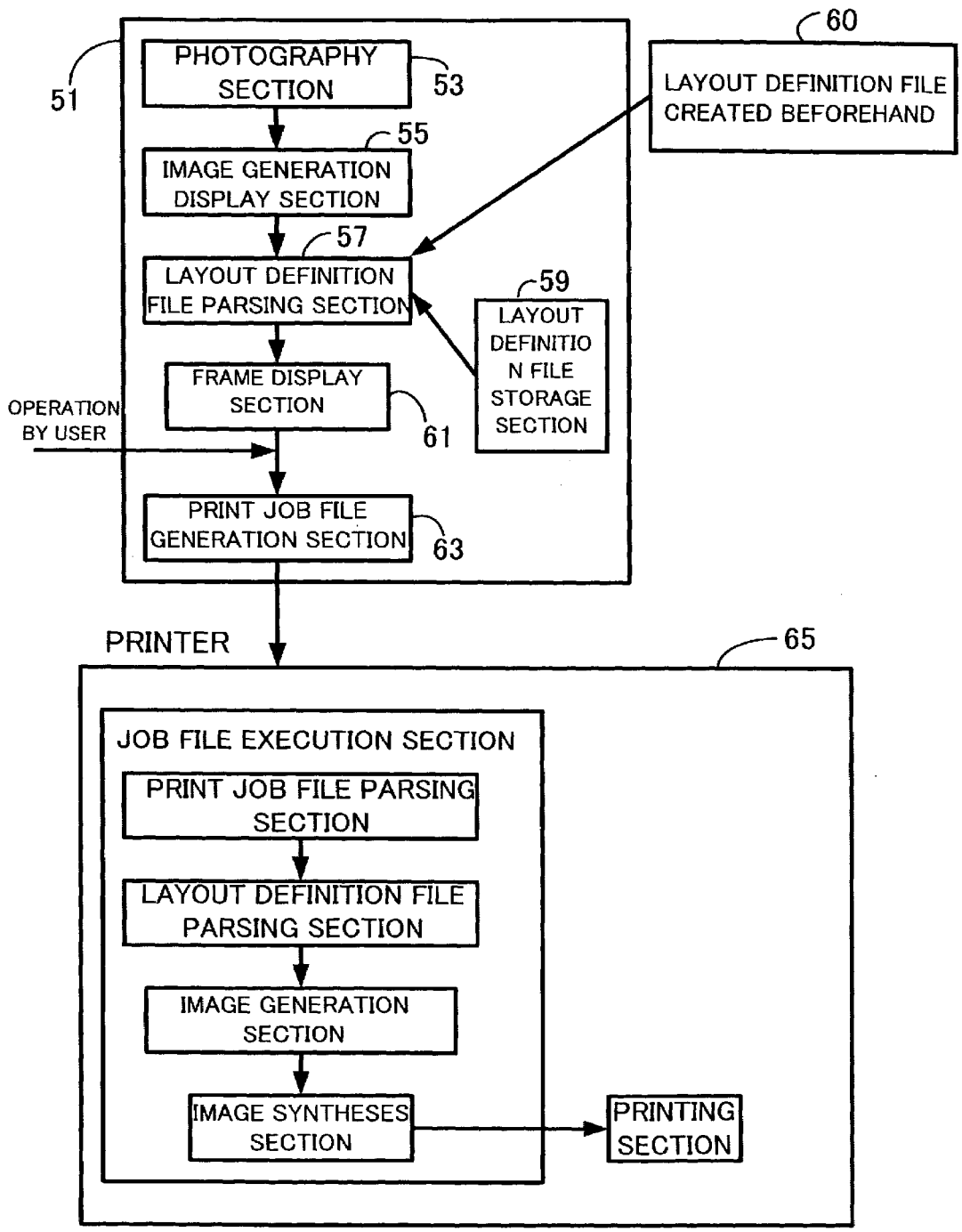
FIG. 7 is a block diagram showing a print system according to a second embodiment of the present invention.

FIG. 7 shows a print system according to the second embodiment of the present invention. Further, the same terms have been assigned to those elements equipped with the same functions as those of the first embodiment (the same is also true for the third embodiment below).

After a photograph has been taken by the digital camera 51 of the print system shown in this figure, the photographic image thus taken and the page layout described in the layout definition file are displayed on the display screen of the digital camera 51, and hence the work to create the complete page design can be performed via the display screen.

In other words, in this embodiment, in addition to the above-described constituent elements, the digital camera 51 is equipped with an image generation display section 55. The image generation display section 55 is therefore able to display the photographic image thus taken on the display screen of the digital camera 51.

The process flow according to the second embodiment up until the complete page design is printed will be described below.

First of all, the user performs photography. In response to a photography operation by the user, the photography section 9 stores a photographic image mirroring the visual field of the camera at this point in time in a predetermined format (JPEG format, for example). In addition, the image generation display section 55 generates the photographic image thus taken and displays this image on the display screen of the digital camera 51.

Thereafter, a layout definition file parsing section 57 reads the layout definition file from a layout definition file storage section 59, or reads a layout definition file 60 created beforehand from an external device, and then parses the layout definition file thus read.

A frame display section 61 generates the page layout on the basis of the result of the parsing by the layout definition file parsing section 57 and displays the page layout on the display screen of the digital camera 51.

As a result, the photographic image thus taken and the page layout are displayed on the display screen of the digital camera 51. The user operates the digital camera 51, and is able to insert the photographic image as desired in the desired image area in the page layout to create the desired page design.

Once the user has created the desired page design, the digital camera 51 can be instructed to create a print job. In response to a print job creation command from the user, the print job file generation section 63 generates a print job file that describes a print job for printing the desired page design on the basis of the complete page design created by the user.

The print job file thus generated can be captured by the printer 65 by means of the same method adopted in the first embodiment, and, when the print job file is captured by the printer 65, print processing is executed via the same process flow as in the first embodiment.

Further, desired printing conditions and image editing conditions can also be described in the print job file created by the digital camera 51 in this embodiment by operating the digital camera 51, and default printing conditions and image editing conditions (recommended conditions, for example) may be described.

A description of the second embodiment was provided above. Next, the third embodiment will be described.

Figure 8:
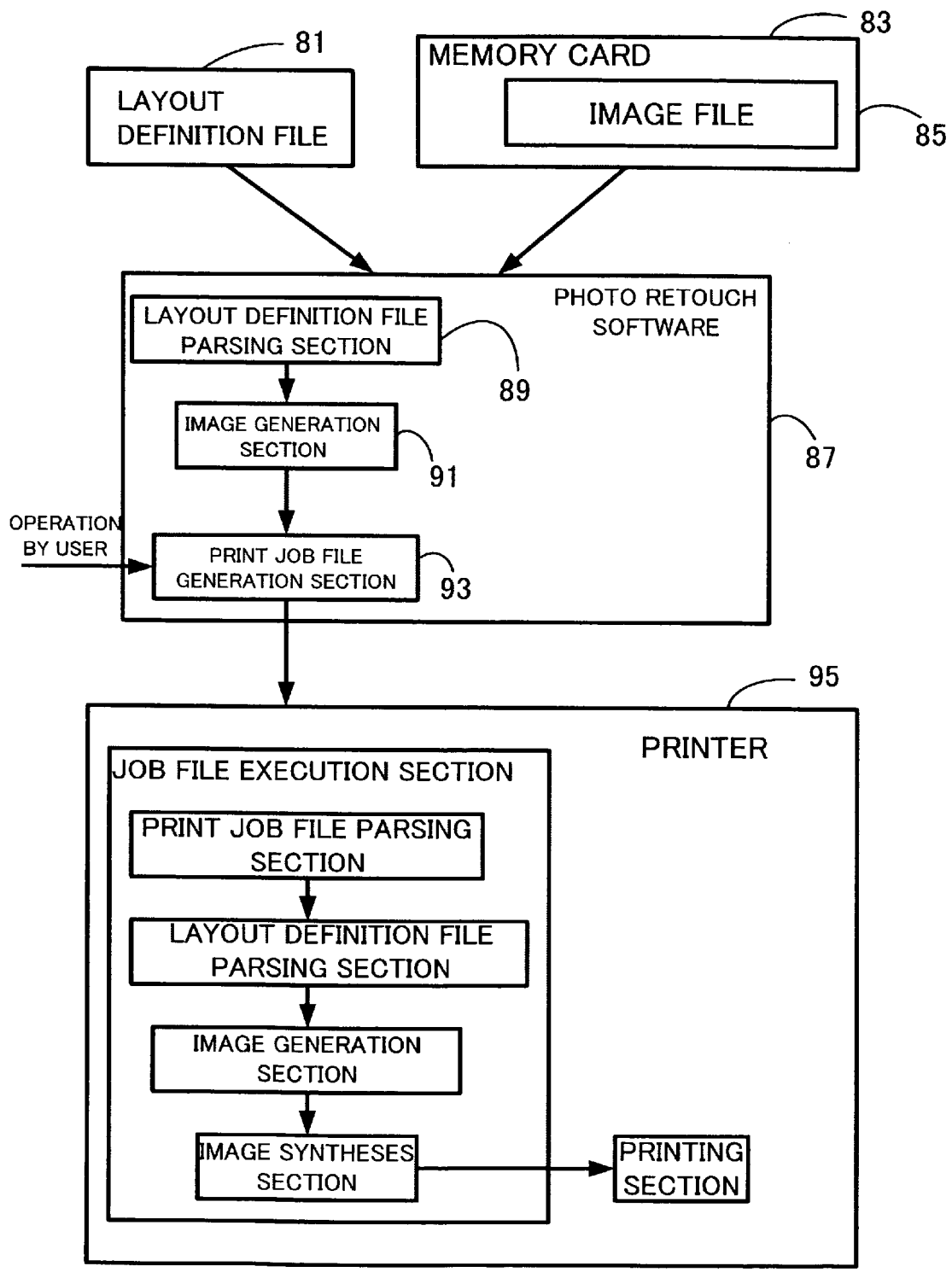
FIG. 8 is a block diagram showing a print system according to a third embodiment of the present invention.

FIG. 8 shows the print system according to the third embodiment of the present invention.

As shown in the figure, in the third embodiment, photo retouch software 87 that can be operated by means of a user terminal such as a personal computer is used (this photo retouch software 87 may be the dedicated editor described in the first embodiment, for example).

The photo retouch software 87 comprises a layout definition file parsing section 89, an image generation section 91, and a print job file generation section 93.

The process flow according to the third embodiment up until the complete page design is printed will be described below.

First of all, the user operates the user terminal and captures a layout definition file 81 and an image file 85 in the user terminal by means of a desired method. Possible methods for acquiring the layout definition file 81 include, for example, a method for creating the layout definition file 81 by using the above-described dedicated editor in the user terminal or a method involving capture from an external device in which the layout definition file 81 is stored. In addition, possible methods for capturing the image file 85 include, for example, a method involving capturing the image file 85 in the user terminal by installing a transportable recording medium, such as a memory card 83 on which the image file 85 generated by the digital camera is held, in a corresponding drive device.

After the layout definition file 81 has been captured by the user terminal, the layout definition file parsing section 89 of the photo retouch software 87 parses the layout definition file 81 in response to a user terminal operation by the user, and generates the page layout on the basis of the parsing result. The page layout thus generated is then displayed on the display screen of the user terminal.

In addition, after the image file 85 has been captured by the user terminal, the image generation section 91 of the photo retouch software 87 generates an image in the image file 85 in response to a user terminal operation by the user. The image thus generated is then displayed on the display screen of the user terminal.

Further, the print job file generation section 93 of the photo retouch software 87 . . . complete . . .

As a result, the image and page layout are displayed on the display screen of the user terminal. The user uses the photo retouch software 87, and is thus able to create the desired page design by inserting an image as desired in a desired image area in the page layout thus displayed on the display screen. In addition, at this time, the user is able to input desired printing conditions and image editing conditions and so forth in the user terminal.

Once the user has created the desired page design, the photo retouch software 87 can be instructed to create the print job. In response to the print job creation command from the user, the print job file generation section 93 generates a print job on the basis of the full page design created by the user and the inputted printing conditions, and so forth, and generates a print job file describing this print job.

The print job file thus generated can be captured by a printer 95 by means of the same method as in the first embodiment, and, when the print job file is captured by the printer 95, print processing is executed by means of the same process flow as in the first embodiment.

The third embodiment was described above.

Figure 9:
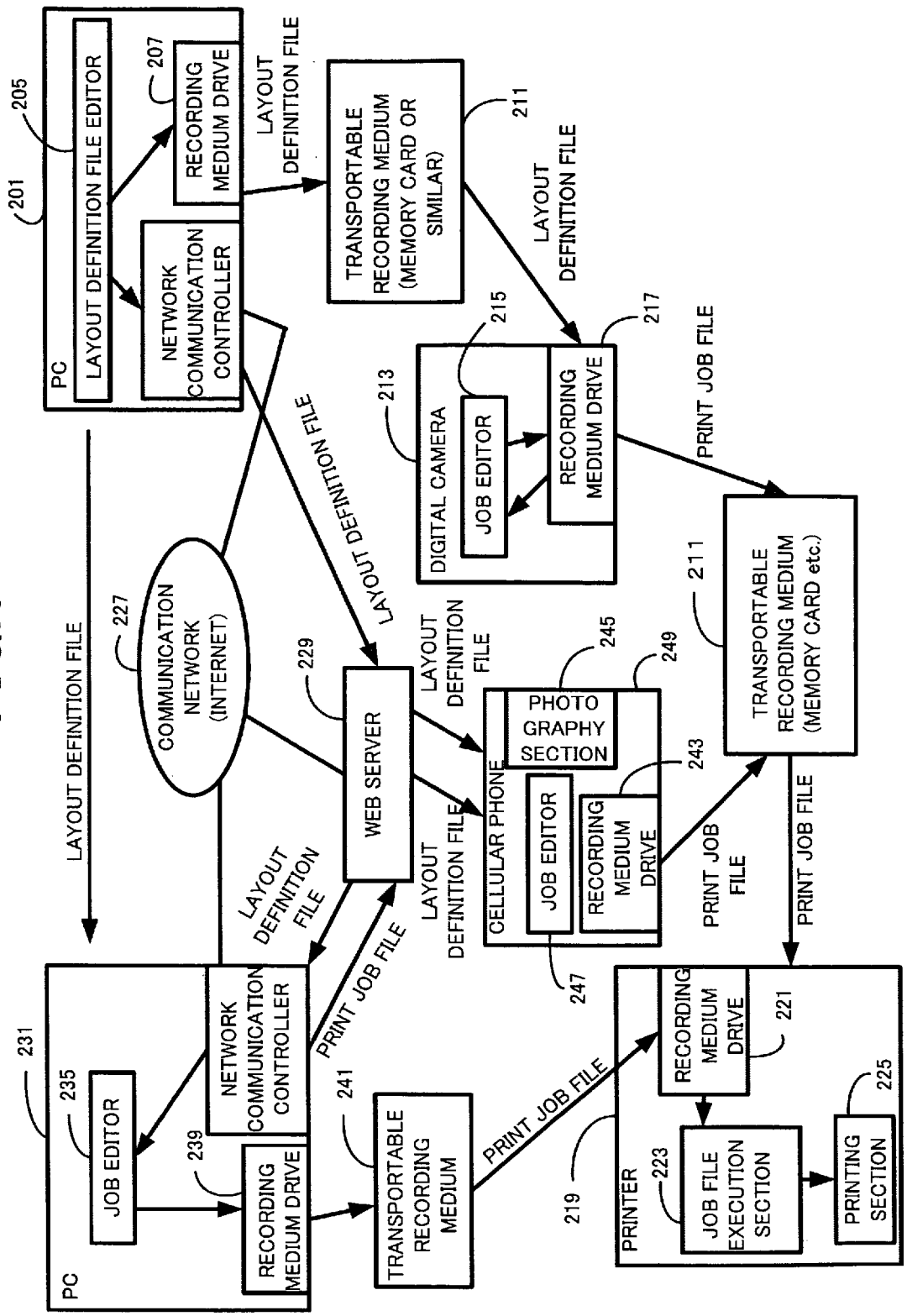
FIG. 9 serves to illustrate a usage example of a page design and a page layout that constitutes this page design.

According to the first to third embodiments described above, because the page design and the page layout constituting same (naturally, also other constituent elements such as photographic images and decorative parts, and so forth) are in file format, the page design and page layout can be used freely as detailed below, for example. Usage examples thereof will be described below with reference to FIG. 9.

(1) First Usage Example

A first user uses a layout definition file editor 205 that is installed in a first personal computer ("PC" below) 201, and thus creates a desired page layout and writes this page layout to a transportable recording medium (memory card or CD-ROM or similar) 211 that is installed in a recording medium drive 207 mounted in the first PC201.

Thereafter, the first user installs the transportable recording medium 211 on which the desired page layout is held in a recording medium drive 217 installed in a digital camera 213, and creates a page design (the page design is created by means of the same method as in the first or second embodiment, for example) in which the desired photographic image is applied to the desired page layout by operating the job editor with which the digital camera 213 is equipped (software provided with the above-described print job file generation section). Then, the first user operates the digital camera 1 and thus generates a print job file describing the print job of the page design, and stores this file on the transportable recording medium 211.

When printing the page design, the first user installs the transportable recording medium 211 in the recording medium drive 221 mounted in a printer 219. In response to a command from the user or upon detecting the installation of the transportable recording medium 211, the printer 219 is automatically activated, detects the print job file in the transportable recording medium 211, reads the detected print job file and the layout definition file associated with this file, and so forth, executes the print job described in the print job file by means of a job file execution section 223 and printing section 225, and then starts printing the page design desired by the user. As a result, the first user is able to obtain a printout of the desired page design.

(2) Second Usage Example

The first user operates the first PC 201 and transmits the layout definition file thus created to the PC 231 of the second user constituting a desired destination by using electronic mail.

The second user uses a job editor 235 that is installed in the second PC 231, and is thus able to create the desired page design by using a page layout described in the layout definition file received by the first PC 201. The second user operates the job editor 235, and thus creates the print job file describing the print job of the desired page design, and writes this file to a transportable recording medium 241 that is installed in a recording medium drive 239 mounted in the second PC 231.

When printing the page design, the second user installs the transportable recording medium 241 in the recording medium drive 221 mounted in the printer 219. As a result, the second user is able to obtain a printout of the desired page layout from the printer 219.

(3) Third Usage Example

The first user operates the first PC 201 to upload the layout definition file thus created from the first PC 201 to a WEB server 229 via a communication network 227.

The second user downloads the layout definition file from the first user which is on the WEB server 229 to the second PC 231. Thereafter, the second user creates the desired page design and obtains a printout thereof by means of the same method as the second usage example.

(4) Fourth Usage Example

The first user uploads the layout definition file thus created from the first PC 201 to the WEB server 229.

The third user operates a cellular phone equipped with a photography section 245 (that is, a cellular phone equipped with a digital camera function) 249 to cumulatively store desired photographic images in the cellular phone 249. In addition, the third user downloads the layout definition file of the first user from the WEB server 229 to the cellular phone 249. Then the third user uses a job editor 247 that is installed in the cellular phone 245 to create a page design in which a desired photographic image is applied to the page layout described in the downloaded layout definition file. Thereafter, the third user operates the cellular phone 249, and thus creates a print job file describing the page design print job and writes this file to the transportable recording medium 211 that is installed in the recording medium drive 243 mounted in the cellular phone 249.

When printing the page design, the third user installs the transportable recording medium 211 in the recording medium drive 221 mounted in the printer 219. As a result, the third user is able to obtain a printout of the desired page layout from the printer 219.

(5) Fifth Usage Example

The second user uploads a print job file for printing a desired page design from the second PC 231 to the WEB server 229. At such time, the layout definition file or image file associated with the print job file is also uploaded to the WEB server 229 along with the print job file (hereinafter, the movement of the layout definition file or image file along with the print job file will be referred to as "accompanying movement", while the independent movement of the print job file will be referred to as "independent movement"). Cases where accompanying movement is performed that may be considered are, for example, a case where an enquiry is made to the user regarding whether accompanying movement or independent movement is required when the print job file is moved, and accompanying movement is selected by way of response, or a case where the path name of the layout definition file and image file described in the print job file is a relative path name.

When so desired, the third user downloads the print job file of the second user from the WEB server 229 to the cellular phone 247. Here, the layout definition file or image file associated with the print job file is downloaded to the cellular phone 249 along with the print job file. The third user uses the job editor 247 and is able to create the desired page design by switching the layout definition file or image file thus downloaded with a desired layout definition file or image file. A printout of the desired page design can be obtained by means of the method described in the fourth usage example.

(6) Sixth Usage Example

The second user uploads the print job file for printing the desired page design from the second PC 231 to the WEB server 229. Here, the layout definition file or image file associated with the print job file does not accompany the print job file, that is, the print job file moves independently. Cases where independent movement is performed that may be considered are, for example, a case where an enquiry is made to the user regarding whether accompanying movement or independent movement is required when the print job file is moved, and independent movement is selected by way of response, or a case where the path name of the layout definition file and image file described in the print job file is an absolute path name.

When so desired, the third user downloads the print job file of the second user from the WEB server 229 to the cellular phone 247. The third user uses the job editor 247, and is able to create the desired page design by editing the downloaded print job file. A printout of the desired page design is obtained by means of the method described in the fourth usage example.

Alternatively, the third user stores the downloaded print job file as is on the transportable recording medium 211, and then installs the transportable recording medium 211 in the printer 219. Here, an absolute path name (URL, for example) is described for the layout definition file and image file in the print job file, and if a communication function that utilizes the communication network 227 is installed in the printer 219, the printer 219 parses the print job file in the transportable recording medium 211 and, based on the print job file, collects the layout definition file and image file associated with the print job file via the communication network 227, and thus executes the print job described in the print job file.

Furthermore, although there may be some overlap with the content of the description provided thus far, other different embodiments will be described hereinbelow.

(A) First Different Embodiment

In addition to the method in which a transfer is made via a transportable recording medium such as a memory card, methods for transferring the print job file between devices include methods involving transfers by means of commands, for example. Such methods will be described in detail hereinbelow.

Figure 10:
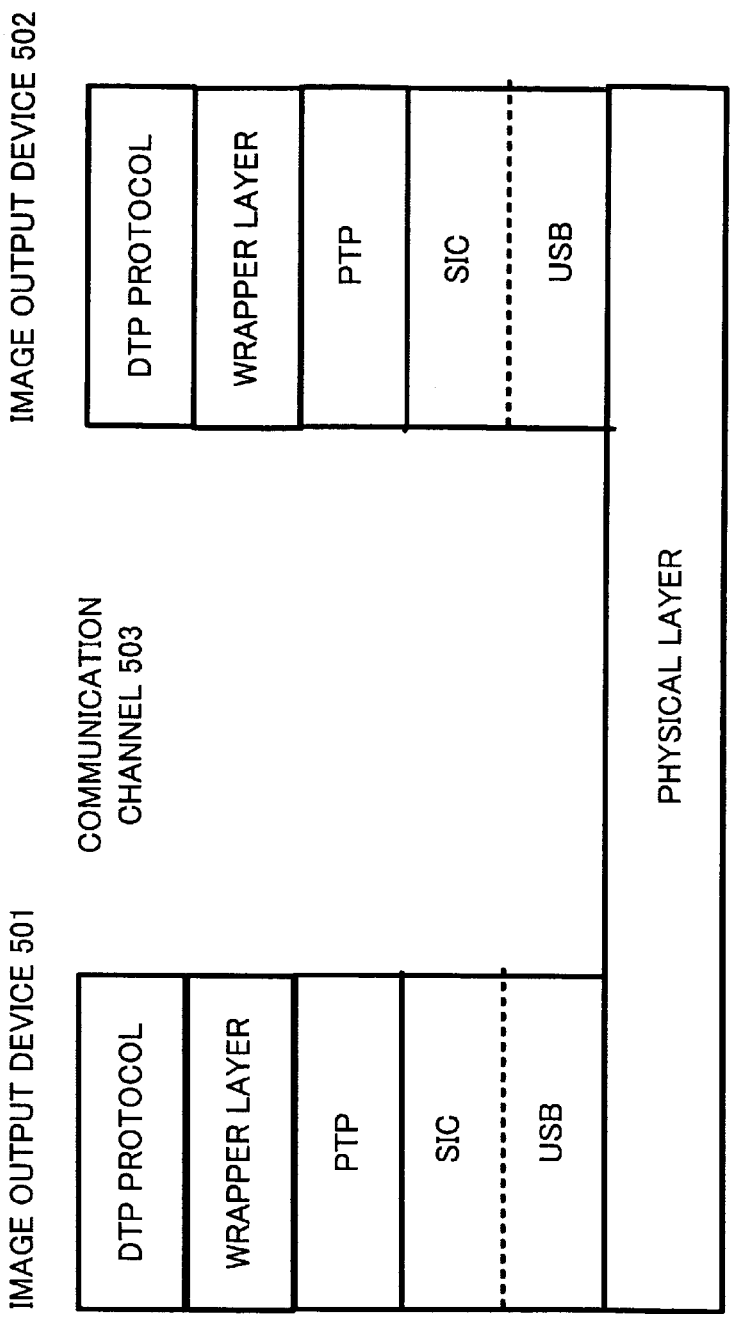
FIG. 10 shows an example of a protocol that is used between an image output device and an image supply device.

FIG. 10 shows an example of a protocol used between an image output device and an image supply device.

First of all, as a physical layer, a communication channel 503 which is a USB (Universal Serial Bus) cable is used. Then, in an image output device 501 and an image supply device 502, there is a USB layer which constitutes a layer for controlling the physical layer of these devices, and a still image class (SIC) is employed as the USB class. A data transfer channel is accordingly implemented. Further, when a USB is used for the communication channel 503, the image output device 501 can be the host, and the image supply device 502 can be the device.

An image transfer protocol (PTP) that stipulates control from outside a digital still image processing device, and an image data transfer to outside the digital still image processing device, and the like, is employed in a layer above the USB layer. Further, examples of PTP standards include "PIMA15740:2000" of the "PHOTOGRAPHIC AND IMAGING MANUFACTURERS ASSOCIATION, INC", for example. PTP is a protocol that provides a communication method for exchanging image data between digital still image processing devices, and, with PTP, an object in storage (an image file, for example) is designated by means of an object ID (object handle) instead of a path.

At the top of the above-described PTP, a protocol which serves to supply image data stored in the image supply device 502 such as a digital camera (in other words, a "data output device") directly via the communication channel 503 to the image output device 501 such as a printer (in other words, "a data input device"), and which serves to perform printing (direct printing which is not via a personal computer or similar, for example), is used. According to this protocol (hereinafter, the "DPS (Direct Print Service) protocol"), control information relating to the image output is rendered as a continuous script described by means of Markup language (XML (eXtensible Markup Language), for example) and transmitted and received between the image output device 501 and the image supply device 502 via the communication channel 503. Further, control information relating to the image output includes every kind of command involved in the image output processing, the responses to these commands, and notification of the device states. Furthermore, only control information, for example, is included in this script, the image data itself which is the object of the image output not being included. That is, information such as the storage location of the image data file is contained in the script, whereas the image data itself is not contained therein.

In the communication environment in which the above-described protocol is adopted, the image supply device 502 is capable of supplying a print job file to the image output device 501 by means of a command.

In other words, the image supply device 502 transmits a command containing information identifying the print job file (the file name, and relative or absolute path, for example) to the image output device 501 (the print job file itself may be transmitted as the command), for example.

The image output device 501 parses this command, and issues a request to acquire the print job file to the image supply device 502 on the basis of the print job file identification information contained in the command (for example, a file request command which contains an object ID serving to designate the print job file corresponding with the identification information is transmitted).

By way of response, the image supply device 502 transmits the requested print job file (the print job file specified on the basis of the object ID contained in the received command, for example) to the image output device 501 (at such time, the image supply device 502 may parse the print job file to be transmitted and also transmit the layout file and image file, and so forth, associated with the print job file at predetermined timing (together with the print job file, for example) (this may take place automatically without a request to acquire the layout definition file and image file being received from the image output device 501, for example)).

The image output device 501 receives the print job file from the image supply device 502 and temporarily stores this file in RAM or other memory. Next, the image output device 501 parses the print job file saved to memory and ascertains the location of the layout file and image file identified from the identification information (the file name, relative path or absolute path, for example) on the basis of layout identification information and image identification information described in the print job file. Then, the image output device 501 accesses the image supply device 502 with the same location or another image supply device (a server on the communication network, for example) and acquires the above-described identified layout file and image file from that location (for example, a storage device such as a hard disk in which the identified layout file, image file, and so forth are held) one part at a time (in 8-bit units, for example).

Further, thereafter, the image output device 501 (printer, for example) may play back (display on the display screen or print, for example) the full page design in which an image representing the image file is applied to the image area of the page layout representing the layout file on the basis of the acquired layout file, the image file, and image job file. More specifically, for example, the image output device 501 (CPU of the image output device 501, for example) renders the page layout representing the acquired layout file in the memory within the image output device 501 (RAM, for example). Then, the image output device 501 is thus able to open via memory and play back (displays on the display screen or prints, for example) the full page design in which an image representing the acquired image file is applied to the image area of the page layout rendered in memory, on the basis of the print job file thus acquired.

(B) Second Different Embodiment

The print job file is a file in a predetermined format, such as a file described by means of XML, for example. The print job file contains a job attribute description section, a layout description section, and a print target image description section, and a specified code that is contained in an array of a plurality of description sections or in each description section enables the page design which is to be printed to be determined by a printer. In other words, the printer is able to determine and execute printing of the page design which is to be printed on the basis of the job attribute description section and the layout description section which are contained in the print job file, and the specified code contained in an array of print target image description sections or in each description section.

A few examples of the print job file described using XML are shown below.

Figure 11:
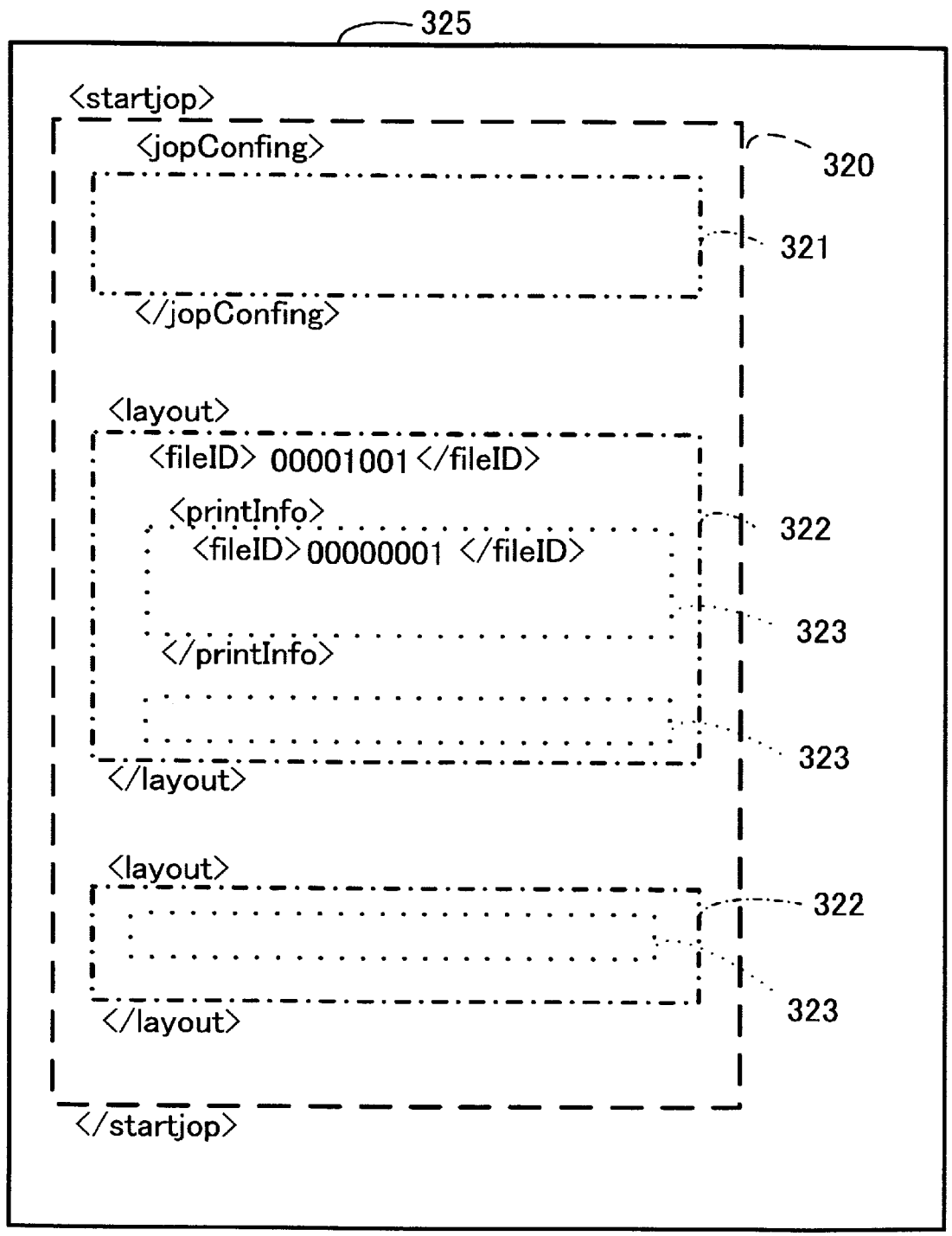
FIG. 11 shows a first example of a print job file that is described using XML.

FIG. 11 shows a first example of a print job file described using XML. Further, in this figure, the descriptive content of the print job file is simplified (the same is true of FIG. 13, which shows a second example of the print job file).

One or a plurality of job description sections 320 is(are) contained in a print job file 325. The job description section 320 is a part of the description within a range lying between two job designation tags (startjob tags), and the job description section 320 contains a job attribute description section 321 and one or a plurality of layout description sections 322. Further, in the case of xx tags, the <xx> tag and the </xx> tag are both designated (as below).

The job attribute description section 321 is a part of the description lying within a range between two job attribute designation tags (jobConfig tags), and describes job attribute information, i.e. printing parameters (printing conditions, for example) such as print quality, paper size, and paper quality, for example.

Each layout description section 322 is a part of the description within a range lying between two layout designation tags (layout tags), and describes at least a layout identification code for the layout file (the relative or absolute path of the layout file, for example). One or two or more print target image description sections 323 are contained in each layout description section 322.

Each print target image description section 323 is a part of the description within a range lying between two image designation tags (printInfo tags), and describes at least an image identification code of the print target image file (the relative or absolute path of the image file, for example). In addition to the identification code for the print target image file, each print target image description section 323 may contain image related information such as a file name, photography date information, information indicating the range to be printed, and the number of prints, for example.

With the print job file 325 according to the first example, a plurality of layout description sections 322 are matched with one job attribute description section 321 (printing parameters, for example). For this reason, a printer that parses the print job file 325 is allowed to print a plurality of page designs represented by each of the plurality of layout description sections 322 on the basis of the same printing parameters.

Further, with the print job file 325 according to the first example, the print target image description section 323 is contained in each of the layout description sections 322. For this reason, the page design to be printed is represented by each of the layout description sections 322. More specifically, for example, one or more image identification codes are matched with each vacant image area ID of each page layout in the print job file 325. The decision regarding which image is applied to which vacant image area is determined by the printer that parses the print job file 325.

For example, if the relationship of correspondence between each vacant image area ID of each page layout and the one or more image identification codes is described in the print job file 325, the printer parsing the print job file 325 prints a page design in which an image corresponding with the image area ID is applied to the image area to which the image area ID has been allocated.

Furthermore, when a vacant image area ID is not described in the print job file 325, for example, the printer prints, for each layout description section 322, one or a plurality of page designs on the basis of the descriptive order of the image identification code, and the value and/or quantity of vacant image areas ID described in the layout file. More specifically, in the case of a certain layout description section 322, for example, when the number of image identification codes is greater than the quantity of vacant image areas ID, the printer prints a plurality of page designs in which a plurality of images represented by a plurality of image identification codes is to be printed. More specifically, for example, in the event that an identification code for a layout file described by a page layout 400 constituting one vacant image area, and N image identification codes representing N (two, for example) print target images 330A, 330B are described in a certain layout description section 322 of the print job file 325, as shown in FIG. 12, the printer parsing the print job file 325 prints N page designs 331A, 331B for which N print target images 330A, 330B are each applied to one vacant image area of the page layout 400.

Figure 12:
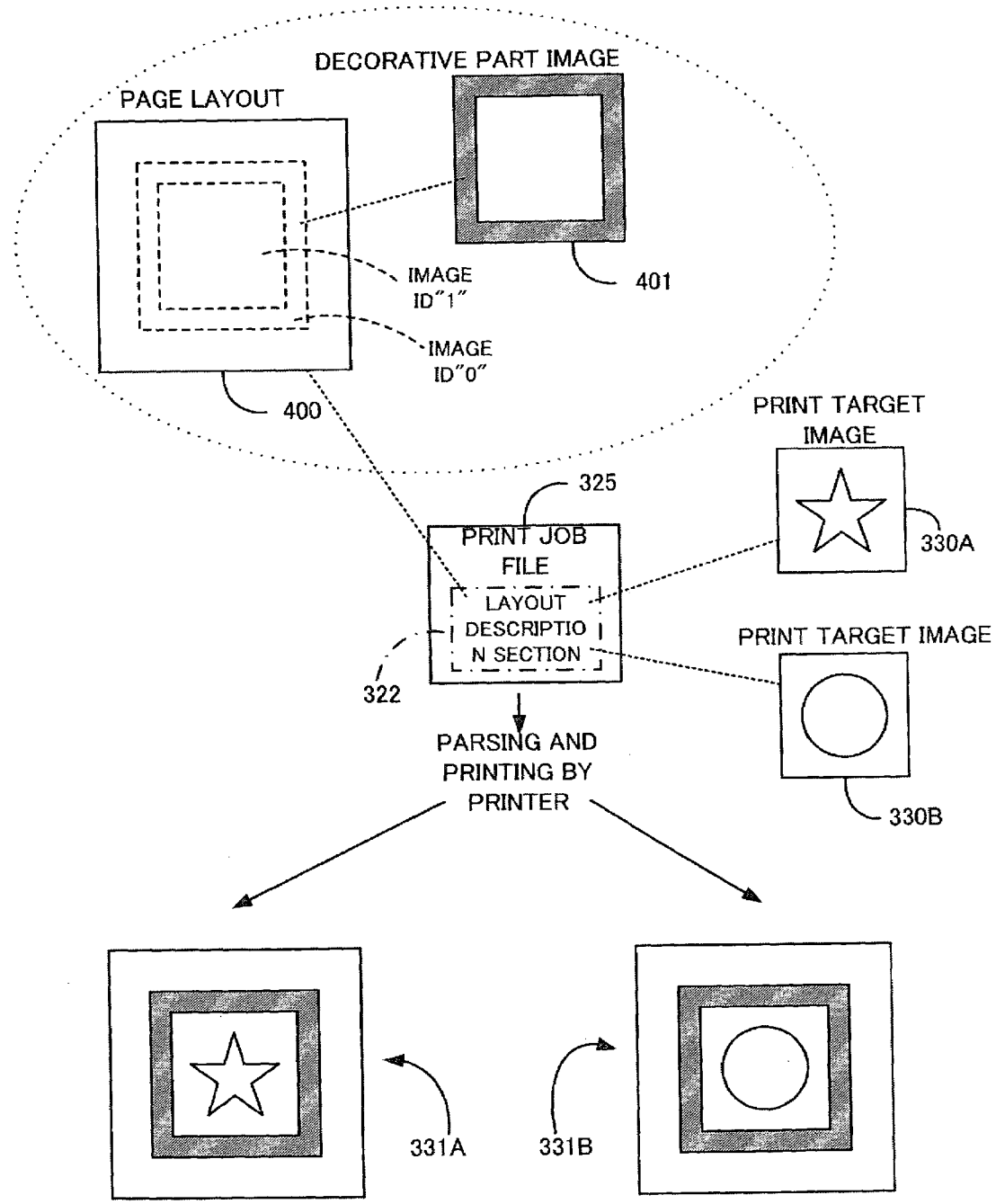
FIG. 12 shows an example of the results when printing is executed on the basis of a print job file according to a first example.

Further, as shown in FIG. 12 for example, an identification code for one or a plurality of decorative part images may be associated with the layout file (may be described, for example). That is, the layout file may be a single file in which the page layout 400 and decorative part images (background or frame image or other image, for example) 401 constitute a package, as indicated by the dotted line ellipse in FIG. 12, for example.

Figure 13:
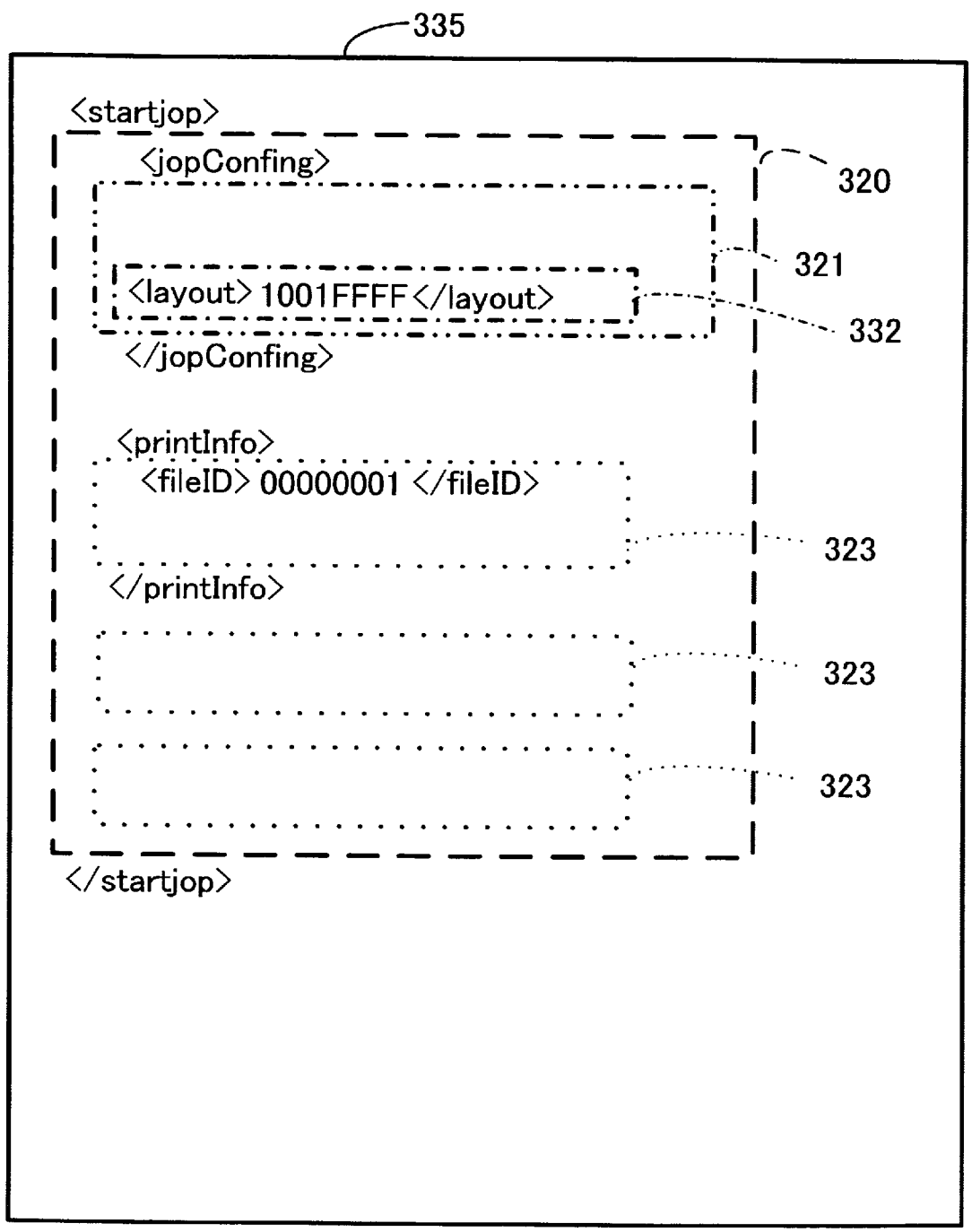
FIG. 13 shows a second example of a print job file that is described using XML.

FIG. 13 shows a second example of a print job file described using XML. In this figure, the same reference numerals have been assigned to the elements which are the same as in the first example. In the following description, the description of the content that duplicates that of the first example will be simplified or omitted.

One or a plurality of job description sections 320 is(are) contained in the print job file 335, and the job description section 320 contains the job attribute description section 321 and one or two or more print target image description sections 323. One or two or more print target image description sections 323 are located below the job attribute description section 321.

In addition to printing parameters, the job attribute description 321 contains a layout description section 332. A layout identification code is not contained in the layout description section 332, and a code of a predetermined number of digits is contained in this section, a specified part of this code of a predetermined number of digits being a specified code. More specifically, for example, the minor code of this code of a predetermined number of digits (for example, when the code of a predetermined number of digits is an 8-bit code, the code of the last four digits) is the specified code (FFFF, for example).

The specified code allows a printer to discriminate, as the layout identification code, an image identification code that is contained in all or a predetermined part of the print target image description section 323 (the print target image description section 323 at the very bottom of the job description section 320, for example) that lies in the lower section of the layout description section 322. In other words, when the printer that parses the print job file 335 shown in the figure detects the specified code, the file represented by the image identification code contained in all or a predetermined part of the print target image description section 323 (the print target image description section 323 at the very bottom of the job description section 320, for example) that lies in the lower section of the layout description section 322 is handled as the layout file, and it is thus possible to print a page design in which an image represented by another print target image description section 323 is applied to the page layout represented by the layout file.

With the print job file 335 of the second example, the printing of a desired page design by a printer can be enabled by modifying, adding, or erasing the existing tag defined values without extending or newly adding a tag.

In addition, with the above-described print job file 335, because a specified code is described in part of a minor code, when the printer which is to parse the print job file 335 is temporarily unable to execute print processing on the basis of the specified code, this printer is able to skip a predetermined part of the print job file 335 (all of the job description section 320, for example), and hence adverse effects when a printer of this kind is made to parse the print job file 335 are reduced.

In the second embodiment above, by regulating the position of the tags described in the print job file or inserting a predetermined code in a predetermined description section specified by tags, and so forth, printing of a desired page design by a printer can be enabled. For example, in the print job file, if a first layout description section 323 and a second layout description section 323 are described in the lower section of the first job attribute description section 321, the same printing parameters can be applied to two page designs, and, if a second job attribute description section 321 is inserted between the first layout description section 323 and the second layout description section 323, the printing parameters of the first job attribute description section 321 can be applied to the first layout description section 323 and the printing parameters of the second job attribute description section 321 can be applied to the second layout description section 323.

A few preferred embodiments of the present invention have been described hereinabove. However, these embodiments are examples serving to describe the present invention and are not intended to limit the scope of the present invention to these embodiments above. The present invention can also be implemented in a variety of other embodiments.

Further, if the content of the few embodiments described above is expressed abstractly, the following rendering results.

(1) Rendering 1

A device enabling a printer to print a page with a desired design, comprising:

job creation means for creating a print job for printing a page on which an image desired by a user is applied to a predetermined image area in a given page layout containing one or more image areas disposed on the page; and job output means for externally outputting a print job created by the job creation means by rendering this print job in one or a plurality of file formats that can be parsed by a printer.

(2) Rendering 2

The device according to Rendering 1, wherein a plurality of files of the externally outputted print job contains a layout file describing the page layout, an image file of an image desired by the user, and a print job file that describes the relationship between the layout file and the image file.

(3) Rendering 3

The device according to Rendering 1, further comprising: layout input means for inputting one or more layout files describing the page layout; image input means for inputting one or more image files; layout selection means for selecting a layout file desired by the user from among the one or more layout files from the layout input means; and image selection means for selecting an image file for an image desired by the user which is to be applied to a desired image area among the one or more image areas on the page, from among one or more image files from the image input means, wherein the job creation means creates a print job file which is associated with the selected layout file thus selected by the layout selection means and the selected image file thus selected by the image selection means; and the job output means externally output the print job file thus created by the job creation means, the selected layout file, and the selected image file.

(4) Rendering 4

The device according to Rendering 2, further comprising: print setting means for setting printing conditions desired by the user, wherein the printing conditions thus set are described in the print job file.

(5) Rendering 5

The device according to Rendering 2, wherein the application of a plurality of image files desired by the user to a single image area of the page layout is described as the relationship in the print job file.

(6) Rendering 6

The device according to Rendering 2, wherein the one-to-one application of a plurality of image files desired by the user to a plurality of image areas of the page layout is described as the relationship in the print job file.

(7) Rendering 7

The device according to Rendering 1, wherein one or more additional image area(s) is(are) included in the page layout in addition to the one or more image areas, and the image files of the images applied to the additional image areas are associated with the page layout; and an image file associated with the page layout is included in the plurality of files of the externally outputted print jobs.

(8) Rendering 8

The device according to Rendering 3, wherein the device is built into a digital camera in which a transportable recording medium is detachably mounted; the layout input means are capable of inputting the layout file from the transportable recording medium or memory installed in the digital camera; the image selection means are capable of selecting an image file desired by the user from among image files of photographs taken by the digital camera; and the job output means are capable of outputting the print job file, the selected layout file, and the selected image file, to the transportable recording medium.

(9) Rendering 9

The device according to Rendering 8, further comprising: selected layout display means that, when a photograph is to be taken, display the page layout of the selected layout file on a viewfinder or display device and allow a user to view the visual field of the digital camera via an image area of the page layout thus displayed, wherein, when a photograph is taken in a state where the page layout of the selected layout file is displayed on the viewfinder or display device, the image selection means select an image file of the photograph thus taken in this state as the selected image file.

(10) Rendering 10

The device according to Rendering 2, further comprising: a layout editor for editing the layout file; and layout output means for externally outputting the layout file.

(11) Rendering 11

The device according to Rendering 1, wherein a sound file is associated with the page layout, and the sound file is contained in a plurality of files of the externally outputted print job.

(12) Rendering 12

An operating method for the device enabling a printer to print a page with a desired design, comprising the steps of creating a print job for printing a page on which an image desired by a user is applied to a predetermined image area in a given page layout containing one or more image areas; and externally outputting the print job thus created by rendering this print job in one or a plurality of file formats that can be parsed by a printer

(13) Rendering 13

The device operating method according to Rendering 11, wherein a plurality of files of the externally outputted print job contains a layout file describing the page layout, an image file of an image desired by the user, and a print job file that describes the relationship between the layout file and the image file.

(14) Rendering 14

A print system comprising a device and a printer, wherein the device comprises:

job creation means for creating a print job for printing a page on which an image desired by a user is applied to a predetermined image area in a given page layout containing one or more image areas; and job output means for externally outputting a print job created by the job creation means by rendering this print job in one or a plurality of file formats that can be parsed by a printer; and wherein the printer comprises:

file parsing means for parsing one or a plurality of files that are externally outputted by the job output means; and printing means that perform printing in response to the result of the file parsing by the file parsing means.

(15) Rendering 15

The print system according to Rendering 14, wherein a plurality of files of the externally outputted print job contains a layout file describing the page layout, an image file of an image desired by the user, and a print job file that describes the relationship between the layout file and the image file.

(16) Rendering 16

A printing method that uses a print system comprising a device and a printer, comprising the steps of creating a print job for printing a page on which an image desired by a user is applied to a predetermined image area in a given page layout containing one or more image areas;

outputting the print job thus created from the device to the printer by rendering this print job in one or a plurality of file formats that can be parsed by the printer;

parsing one or a plurality of files that is(are) inputted to the printer; and performing printing in response to the result of the file parsing of the parsing step.

(17) Rendering 17

The printing method according to Rendering 16, wherein a plurality of files of the outputted print job contains a layout file describing the page layout, an image file of an image desired by the user, and a print job file that describes the relationship between the layout file and the image file.

(18) Rendering 18

A printer, comprising:

file parsing means for parsing one or a plurality of files representing a print job for printing a page on which an image desired by a user is applied to a predetermined image area in a given page layout containing one or more image areas; and printing means that perform printing in response to the result of the file parsing by the file parsing means.

(19) Rendering 19

The printer according to Rendering 18, wherein the plurality of files contains a layout file describing the page layout, an image file of an image desired by the user, and a print job file that describes the relationship between the layout file and the image file.

(20) Rendering 20

A printing method that utilizes a printer, comprising the steps of:

parsing one or a plurality of files representing a print job for printing a page on which an image desired by a user is applied to a predetermined image area in a given page layout containing one or more image areas; and performing printing in response to the result of the file parsing of the parsing step.

(21) Rendering 21

The printing method according to Rendering 20, wherein the plurality of files contains a layout file describing the page layout, an image file of an image desired by the user, and a print job file that describes the relationship between the layout file and the image file.

(22) Rendering 22

A storage medium for storing one or a plurality of files that can be parsed by a printer and which represent(s) a print job for printing a page on which an image desired by a user is applied to a predetermined image area in a given page layout containing one or more image areas.

(23) Rendering 23

The storage medium according to Rendering 22, wherein the plurality of files contains a layout file describing the page layout, an image file of an image desired by the user, and a print job file that describes the relationship between the layout file and the image file.

(24) Rendering 24

A data structure constituting a print job that can be parsed by a printer, comprising:

a layout file describing a given page layout containing one or more image areas;

an image file of an image desired by a user; and a print job file describing the relationship between the layout file and the image file.

(25) Rendering 25

A computer program allowing a computer to execute the steps of creating a print job for printing a page on which an image desired by a user is applied to a predetermined image area in a given page layout containing one or more image areas disposed on the page; and rendering the print job thus created in one or a plurality of file formats that can be parsed by a printer.

(26) Rendering 26

A computer program allowing a computer to execute a step of editing at least one file among one or a plurality of files that can be parsed by a printer, the file(s) representing a print job for printing a page on which an image desired by a user is applied to a predetermined image area in a given page layout containing one or more image areas.

The invention claimed is:

1. A printer, comprising:

acquiring section that acquires a print job file representing a print job by selectively performing a first movement or a second movement and printing section that performs printing on the basis of the print job file thus aequired;

wherein:

the print job file contains layout identification information serving to identify a layout file defining a page layout containing an image area and image identification information serving to identify an image file of an image, the first movement is accompanying movement which is movement of the layout file or the image file along with the print job file, the second movement is independent movement of the print job file, and the printing section parses the acquired print job file, prints a page layout that is defined in a layout file that is identified from the layout identification information contained in the print job file, as well as an image that is contained in an image file that is identified from the image identification information contained in the print job file.

2. The printer according to claim 1, wherein:

the print job file has a plurality of image areas which the page layout comprises and association information for placing images in the plurality of image areas; and the printing section prints a page on which images are disposed in each of the plurality of image areas on the basis of the association information.

3. The printer according to claim 1, wherein:

a plurality of layout description sections are contained in the print job file, and each layout description section contains layout identification information serving to identify a layout file describing the page layout, and image identification information serving to identify an image file of an image associated with an image area of the page layout; and the printing section prints a page on which the image is disposed on the basis of the descriptive content for each of the layout description sections.

4. The printer according to claim 1, wherein:

the print job file contains one or more items of file identification information serving to identify each of one or more data files, and a specified code, and the one or more items of file identification information is(are) contained in a predetermined range within the print job file; and, upon detecting the specified code, the printing section handles a data file, which is identified from a predetermined file identification information item among one or more file identification information items within the predetermined range, as a layout file representing the page layout, and handles a data file, which is identified from another file identification information item, as the image file of the image.

5. The printer according to claim 1, wherein the selectively performing the first movement and the second movement comprises:

performing the first movement when a path name of the layout file and image file described in the print job file is a relative path name, and performing the second movement when the path name of the layout file and image file described in the print job file is an absolute patent name.

6. A data source device that is capable of communicating with a job file acquisition device capable of acquiring a print job file, the print job file containing layout identification information serving to identify a layout file defining a page layout containing an image area, and image identification information serving to identify an image file of an image, the data source device comprising:
 a selecting section that selects a first movement or a second movement; and
 an outputting section that outputs the print job file to the job file acquisition device by performing the first movement of the second movement thus selected, wherein:
 the first movement is accompanying movement which is movement of the layout file or the image file along with the print job file,
 the second movement is independent movement of the print job file.

7. The data source device according to claim 6, wherein: when the second movement is selected, the outputting section outputs the layout file and the image file after independently outputting the print job file.

8. The data source device according to claim 6, wherein: an identifier, which indicates a break for each page, and at least one item of image identification information that is associated with the image areas of each page are matched with respect to a single item of layout identification information in the print job file.

9. The data source device according to claim 6, wherein: the print job file further contains a description relating to printing conditions desired by a user.

10. The data source device according to claim 6, wherein: the selecting section selects the first movement when a path name of the layout file and image file described in the print job file is a relative path name, and selects the second movement when the path name of the layout file and image file described in the print job file is absolute path name.

11. A job file acquisition device that is capable of communicating with a data source on which a print job file is saved, the print job file containing layout identification information serving to identify a layout file defining a page layout containing an image area, and image identification information serving to identify an image file of an image, the job file acquisition device comprising:
 an accjuiring section that acquires the print job file by selectively performing a first movement or a second movement, the print job file that is output from the data source; and
 a saving section that parses the print job file thus acquired and saves a layout file that is identified from the layout identification information contained in the print job file, as well as an image file that is identified from the image identification information contained in the print job file, wherein:
 the first movement is accompanying movement which is movement of the layout file or
 the image file along with the print job file, and
 the second movement is independent movement of the print job file.

12. The job file acquisition device according to claim 11, wherein the selectively performing the first movement and the second movement comprises:
 performing the first movement when a path name of the layout file and image file described in the print job file is a relative patent name, and performing the second movement when the path name of the layout file and image file described in the print job file is an absolute path name.

* * * * *